Figure 1:
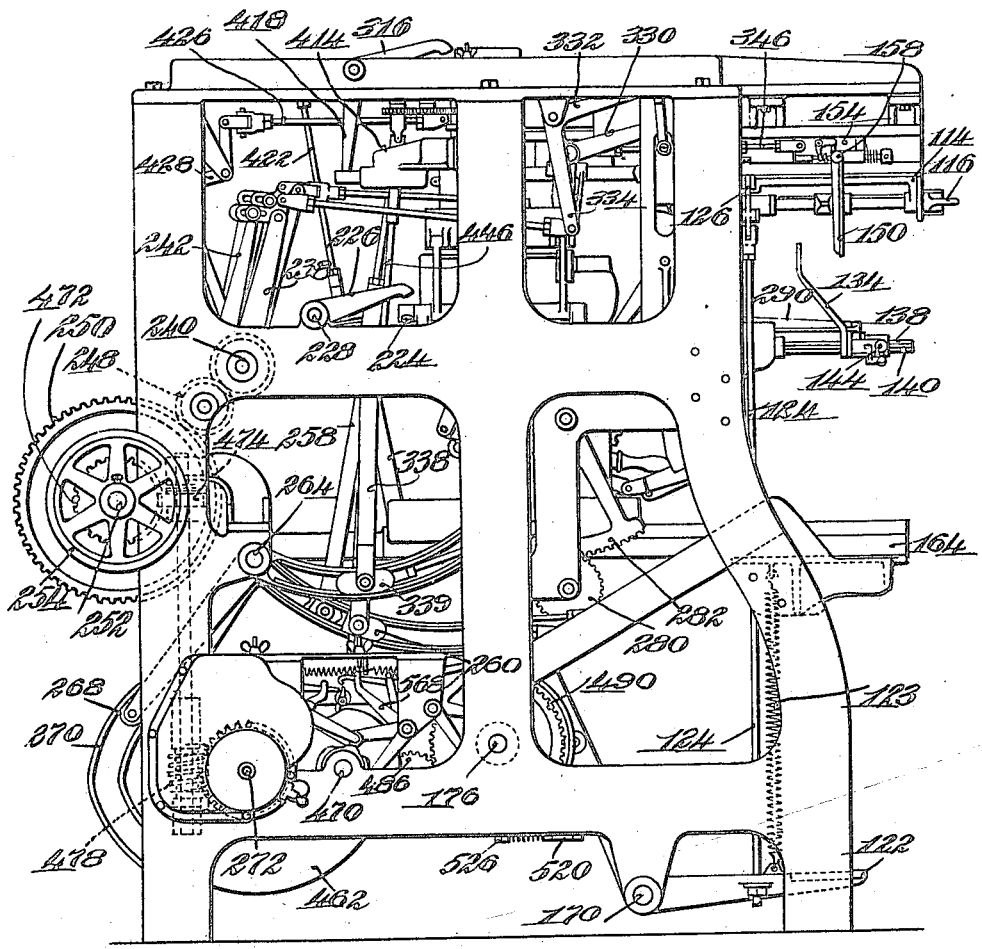

E. E. WINKLEY.
MACHINE FOR OPERATING ON SHOES.
APPLICATION FILED MAY 24, 1915. RENEWED MAR. 31, 1919.

1,372,855.
Patented Mar. 29, 1921.
21 SHEETS—SHEET 1.

Witness
Edward S. Day

Inventor
Erastus E. Winkley
by Phillips Van Everen & Fish
Atty

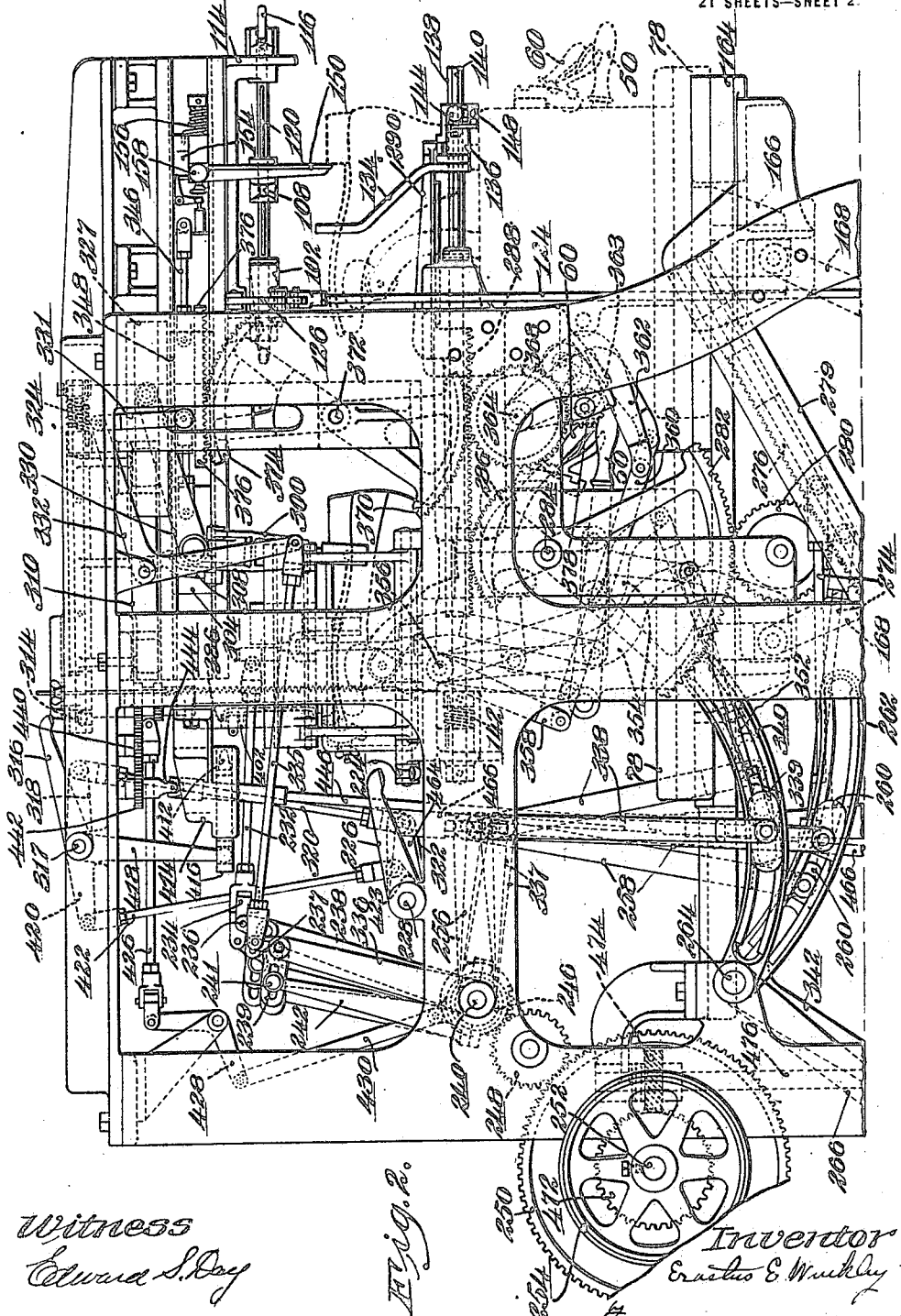

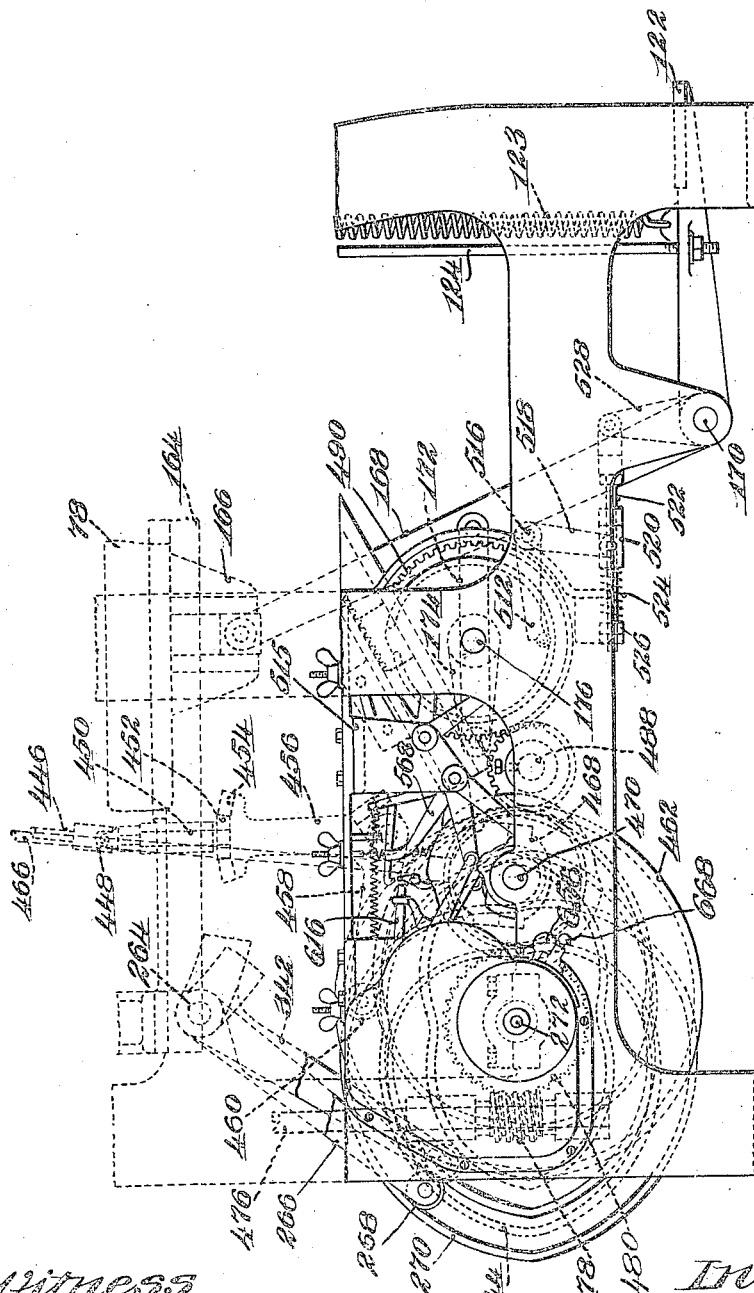

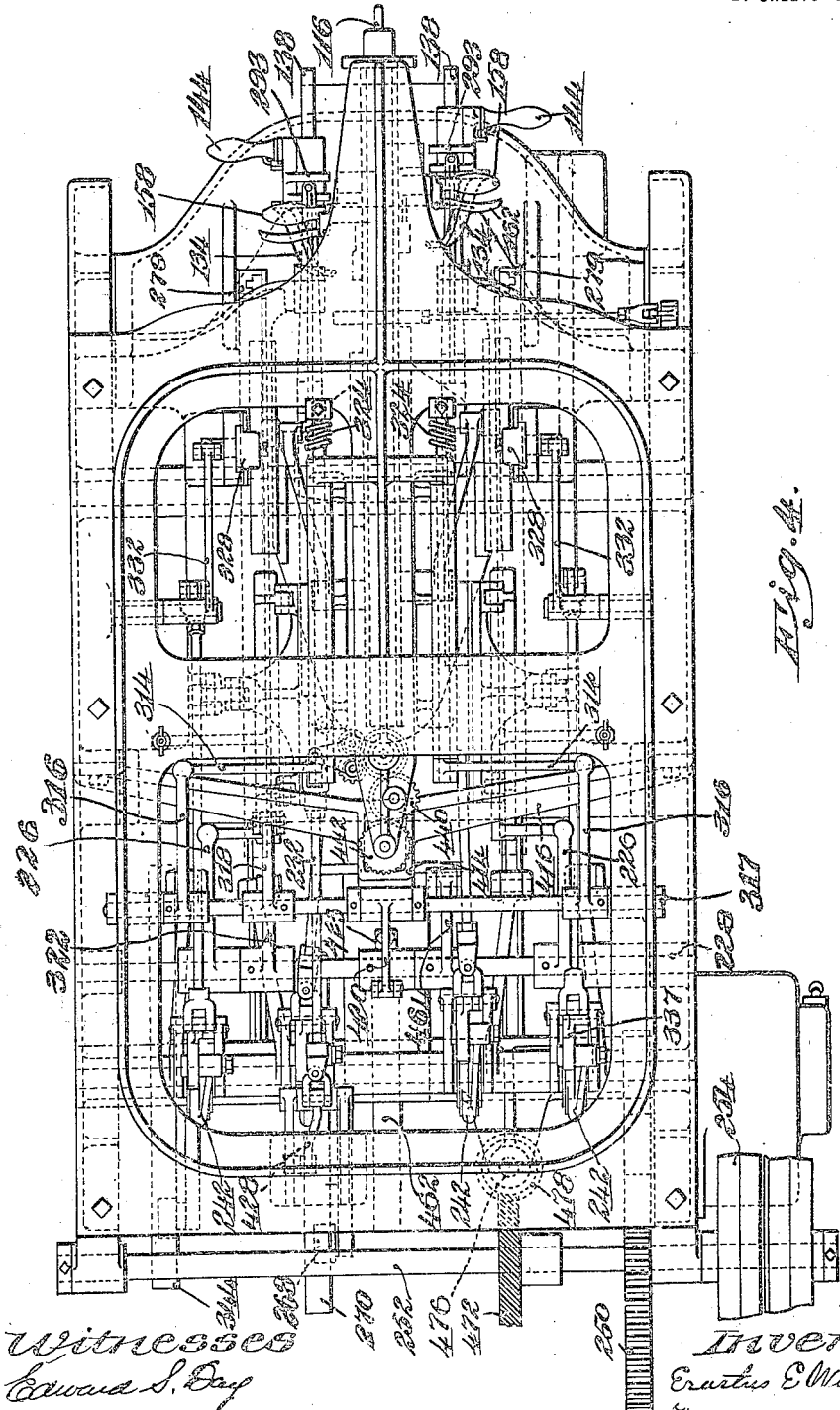

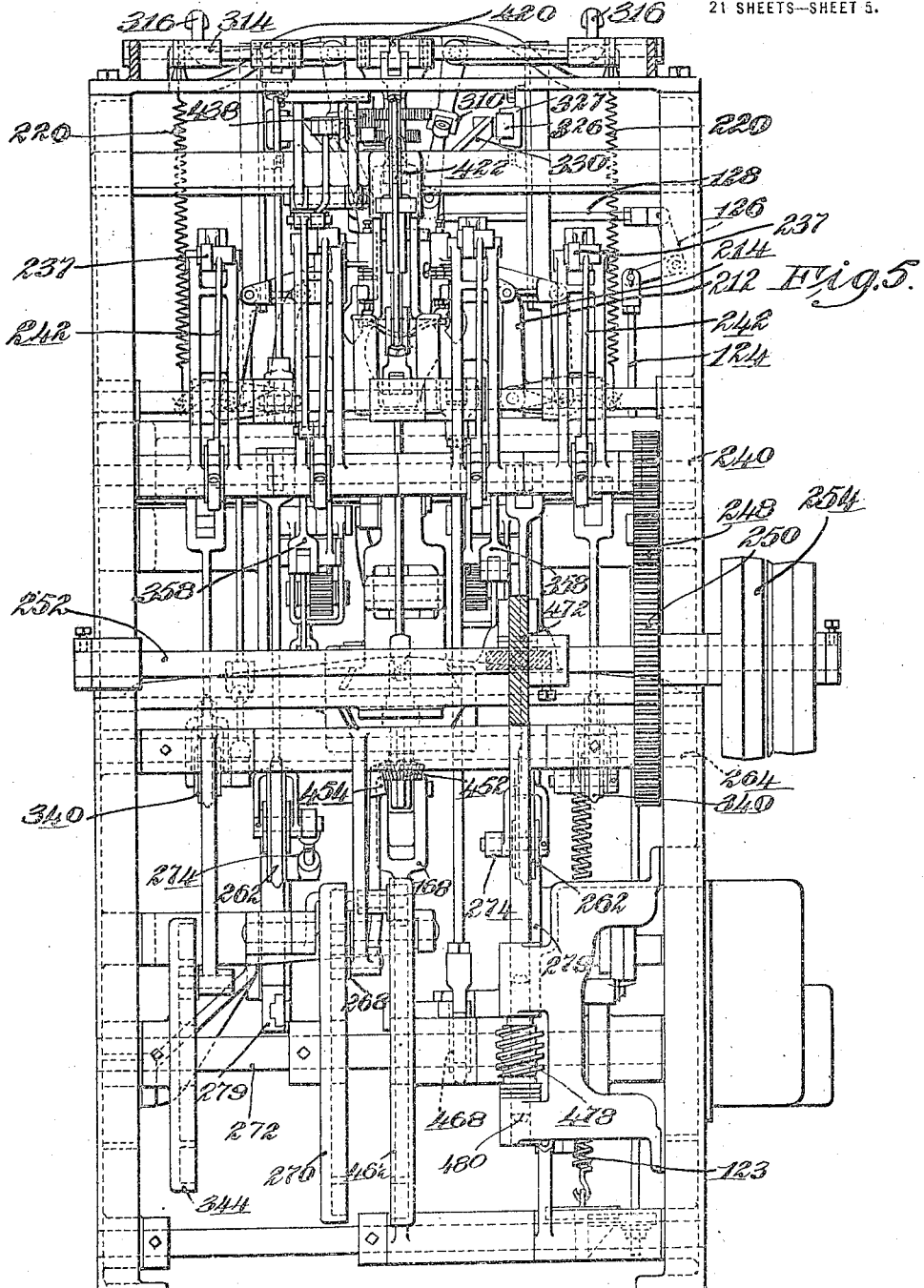

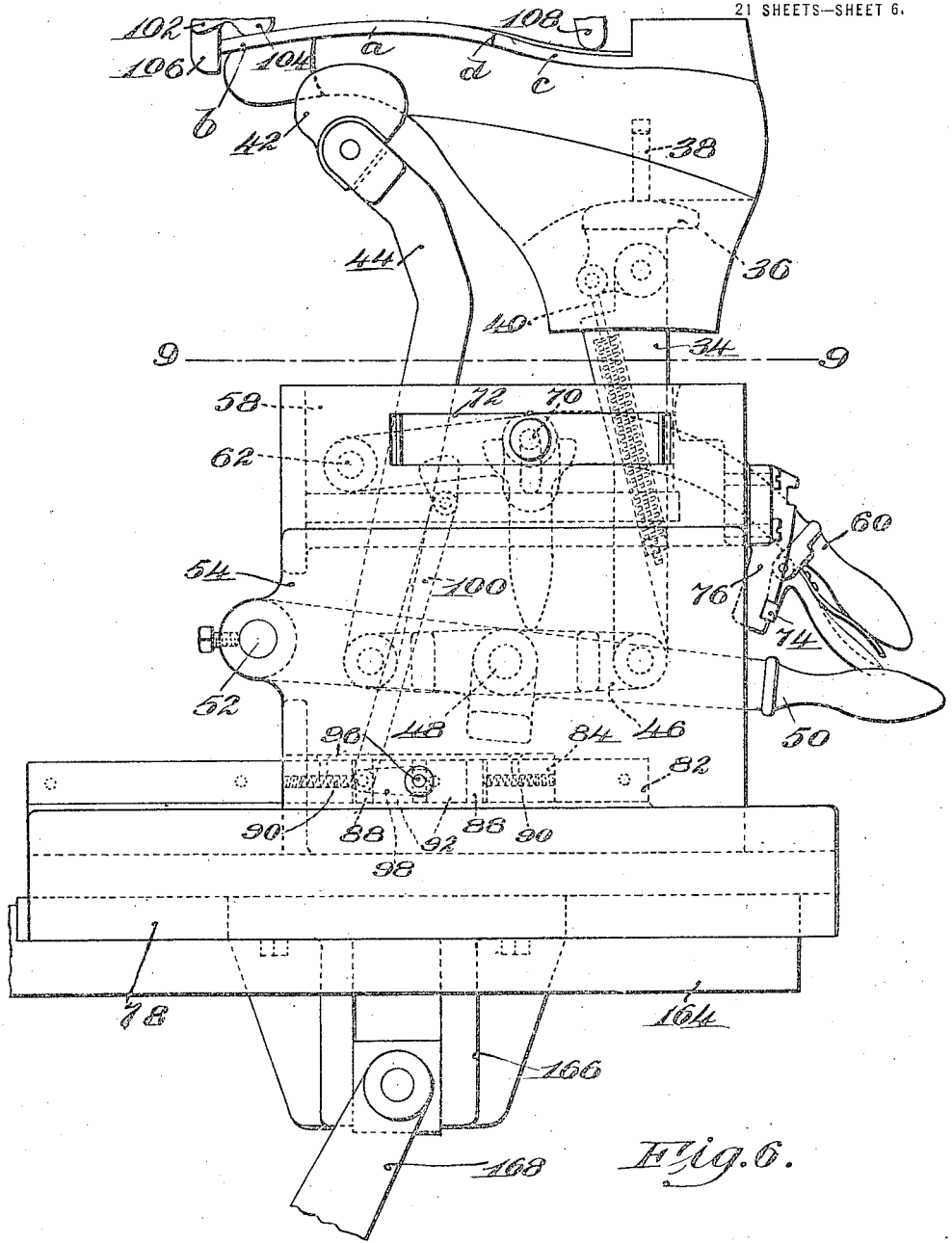

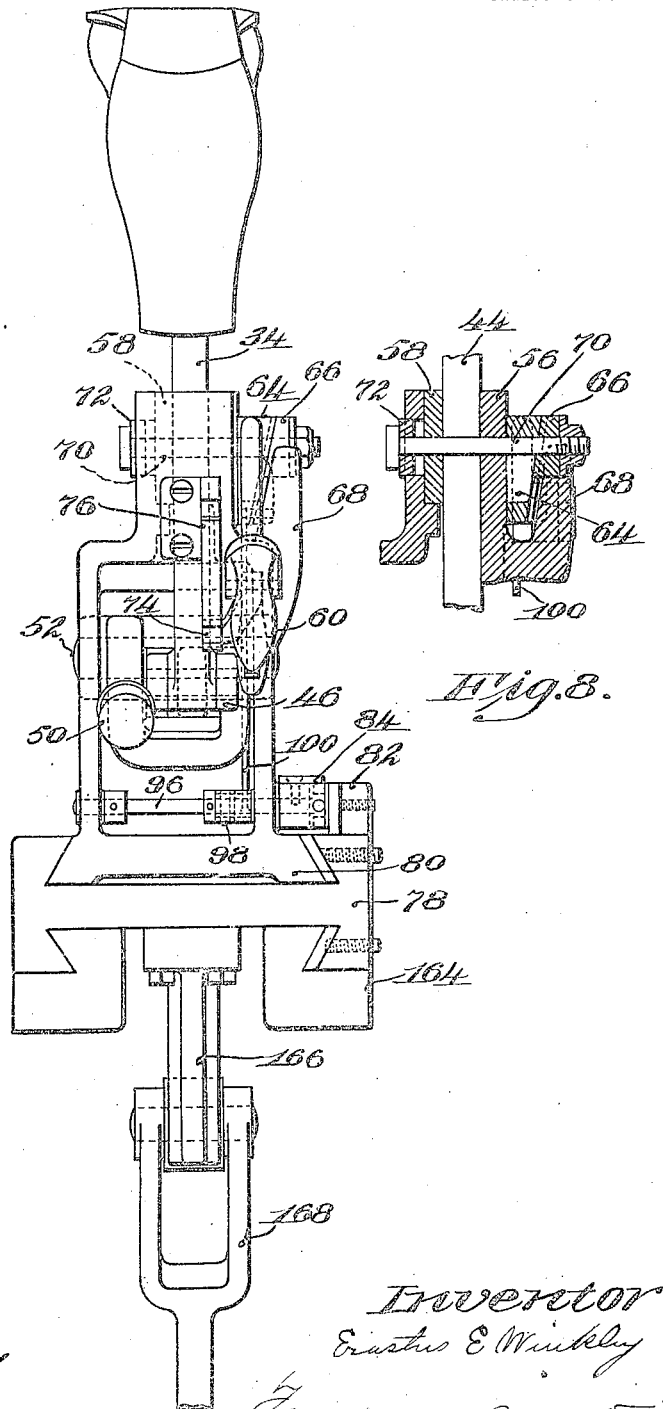

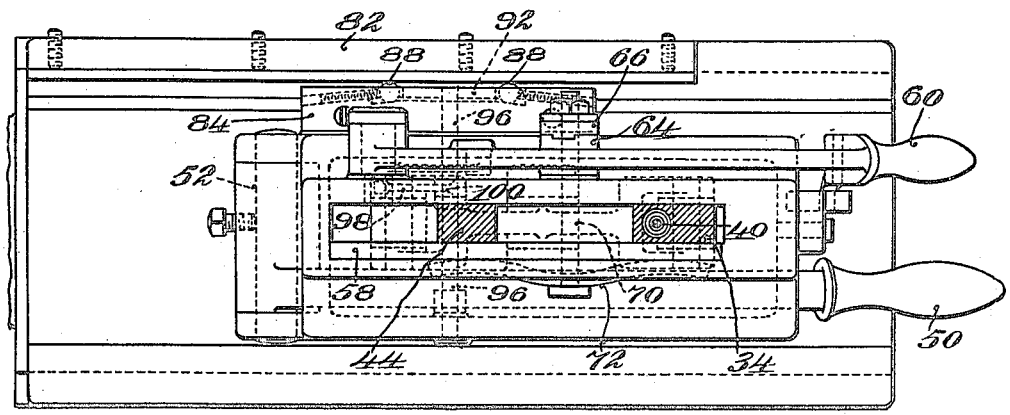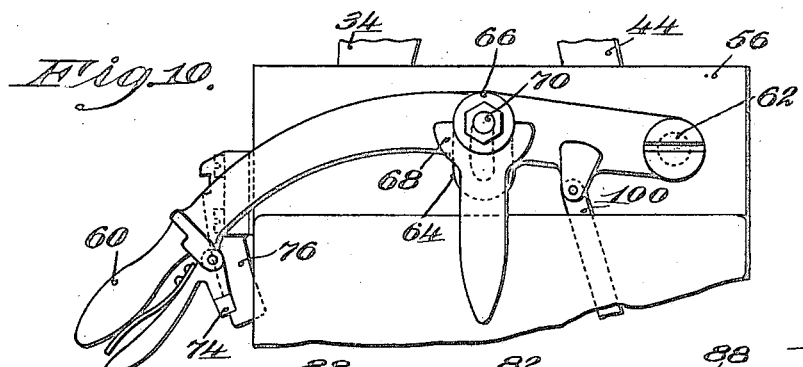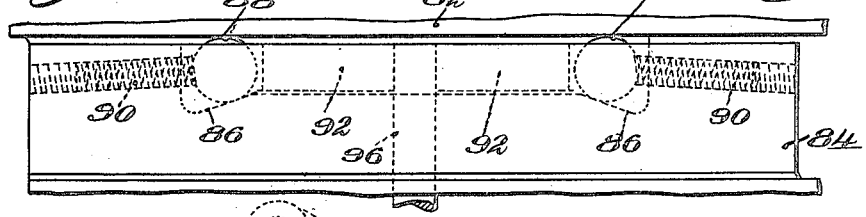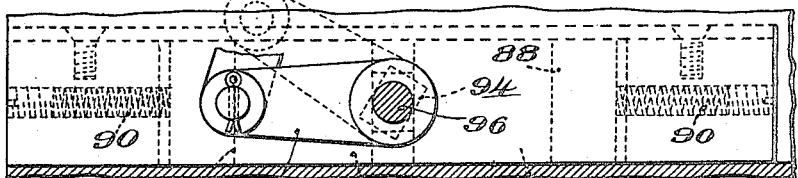

E. E. WINKLEY.
MACHINE FOR OPERATING ON SHOES.
APPLICATION FILED MAY 24, 1915. RENEWED MAR. 31, 1919.

1,372,855.

Patented Mar. 29, 1921.
21 SHEETS—SHEET 13.

Witness
Edward S. Day

Inventor
Erastus E. Winkley
by Phillips Van Everen & Fish
Attys

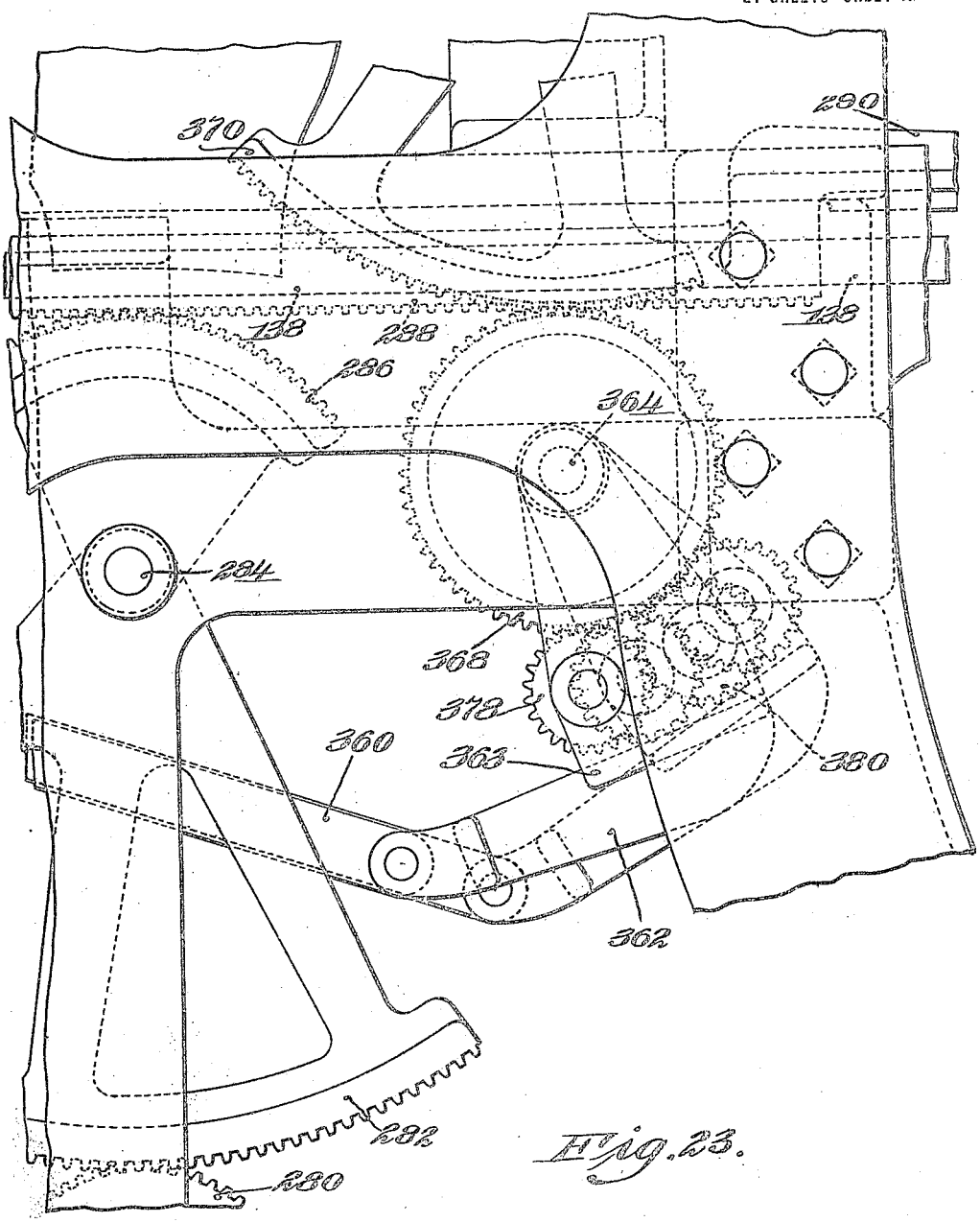

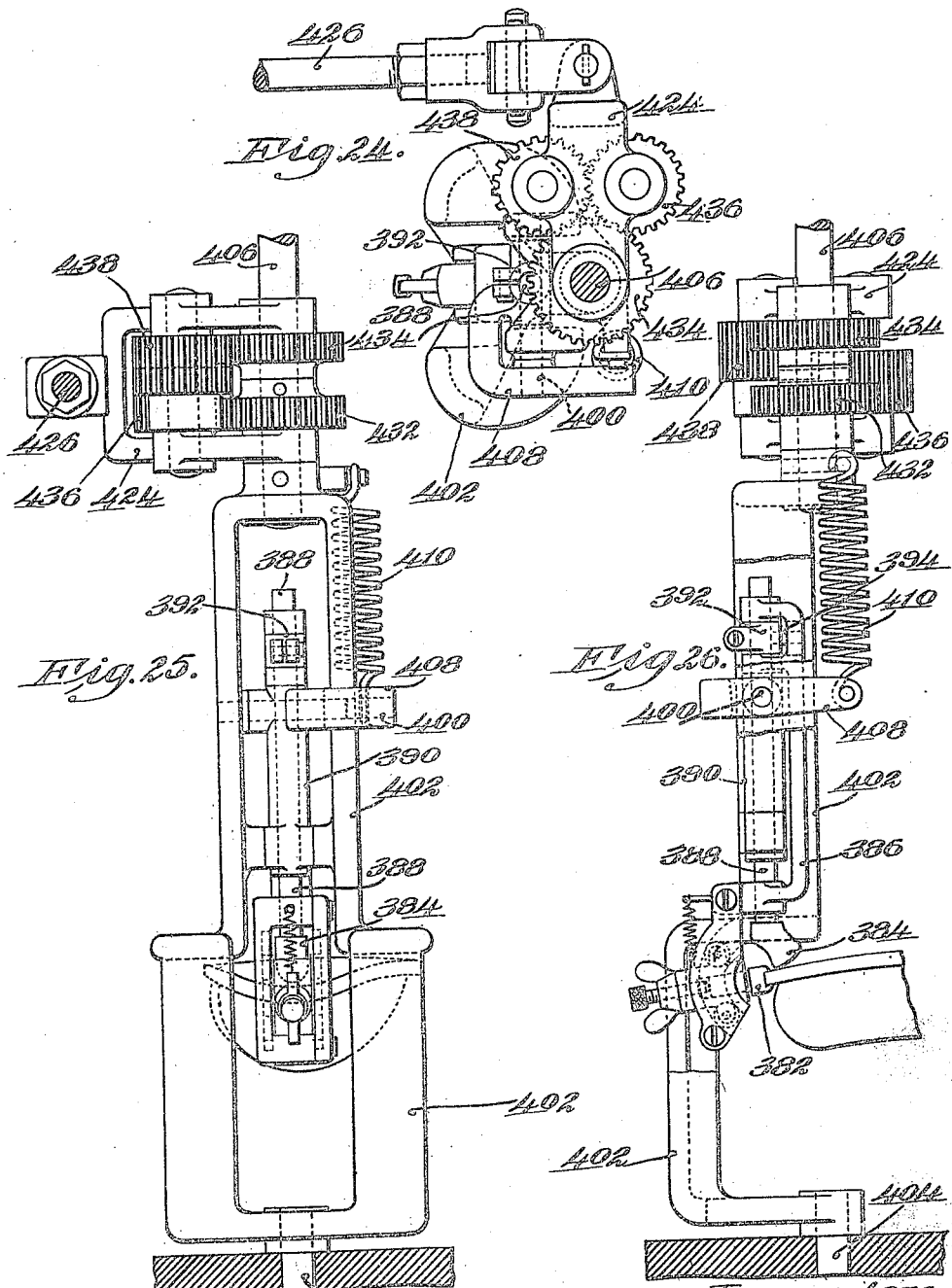

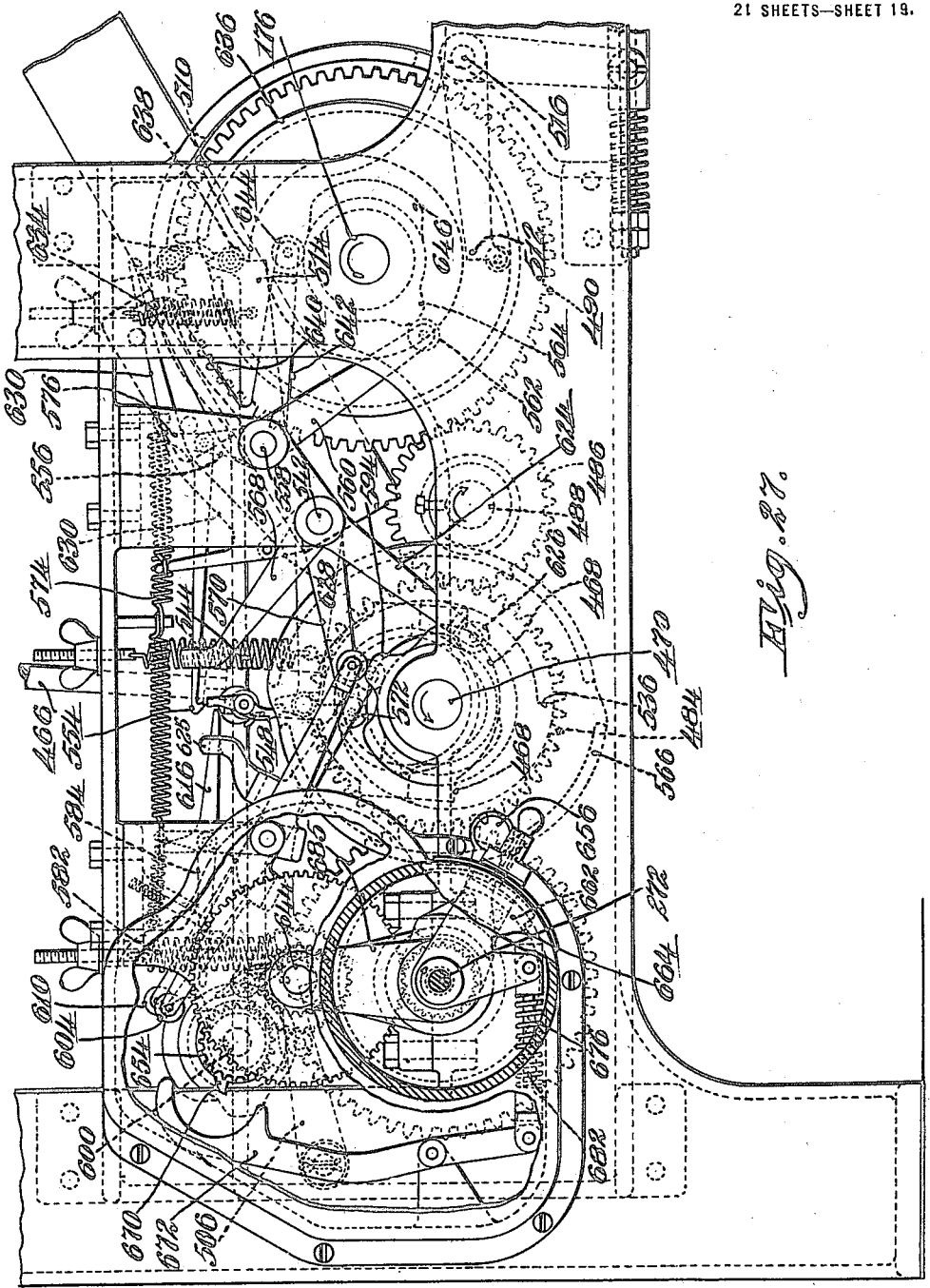

E. E. WINKLEY.
MACHINE FOR OPERATING ON SHOES.
APPLICATION FILED MAY 24, 1915. RENEWED MAR. 31, 1919.

1,372,855.

Patented Mar. 29, 1921.
21 SHEETS—SHEET 20.

Witness
Edward S. Day

Inventor
Erastus E. Winkley
by
Phillips Van Everen & Fish
attys

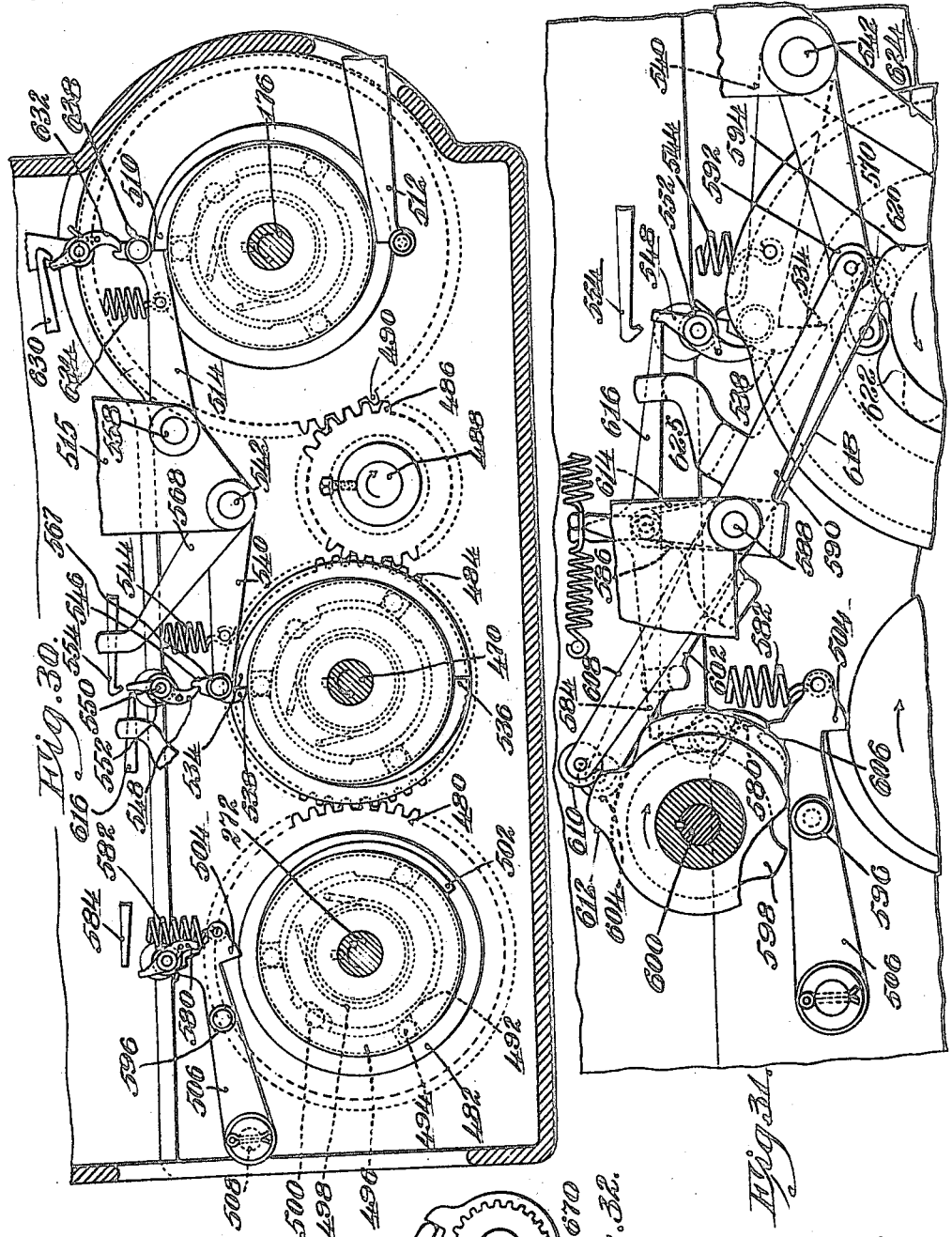

UNITED STATES PATENT OFFICE.

ERASTUS E. WINKLEY, OF LYNN, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR OPERATING ON SHOES.

1,372,855. Specification of Letters Patent. Patented Mar. 29, 1921.

Application filed May 24, 1915, Serial No. 30,221. Renewed March 31, 1919. Serial No. 286,555.

*To all whom it may concern:*

Be it known that I, ERASTUS E. WINKLEY, a citizen of the United States, residing at Lynn, in the county of Essex and State of Massachusetts, have invented certain new and useful Improvements in Machines for Operating on Shoes; and I do hereby declare the following to be a full, clear, and exact description of the invention, such as will enable others skilled in the art to which it appertains to make and use the same.

The invention relates to machines for automatically operating on shoes, and more particularly to machines for operating on the marginal portions or edges of the soles of lasted shoes.

The primary object of the invention is to provide means for manually effecting a preliminary adjustment or setting of the automatic mechanism, whereby the shoe to be operated upon may be utilized to gage or determine the preliminary adjustments requisite to secure the proper automatic operation of the operating means upon the shoe. To this end the invention includes the provision, in a machine for automatically operating upon a predetermined portion of a shoe, of a device which may be manually brought into register with a point on or a portion of a supported shoe by relative movement between the shoe-support and the device, and connections through which this relative movement adjusts or sets the automatic mechanism so that it will operate properly on the predetermined portion of the shoe. By using the shoe to gage or determine the setting of the automatic mechanism, the proper adjustment for the size or style of shoe to be operated upon may be quickly and accurately made without the exercise of skill or careful attention on the part of the operator.

The invention may be embodied in machines for automatically performing various operations involved in the manufacture of shoes, and may be embodied with particular advantage in edge-setting machines for automatically burnishing or setting the edges of shoe soles, or in other machines in which the range or position of the path of operation of the operating means should be varied in operating upon shoes of different sizes and shapes.

In embodying the broader features of the invention in an edge-setting machine, further novel features of construction and combinations of parts, relating particularly to a machine of that kind, have been utilized, which will be hereinafter described and referred to in the claims.

The various features of the invention will be readily understood from an inspection of the accompanying drawings, and the following detailed description of the machine illustrated therein.

Figure 13:
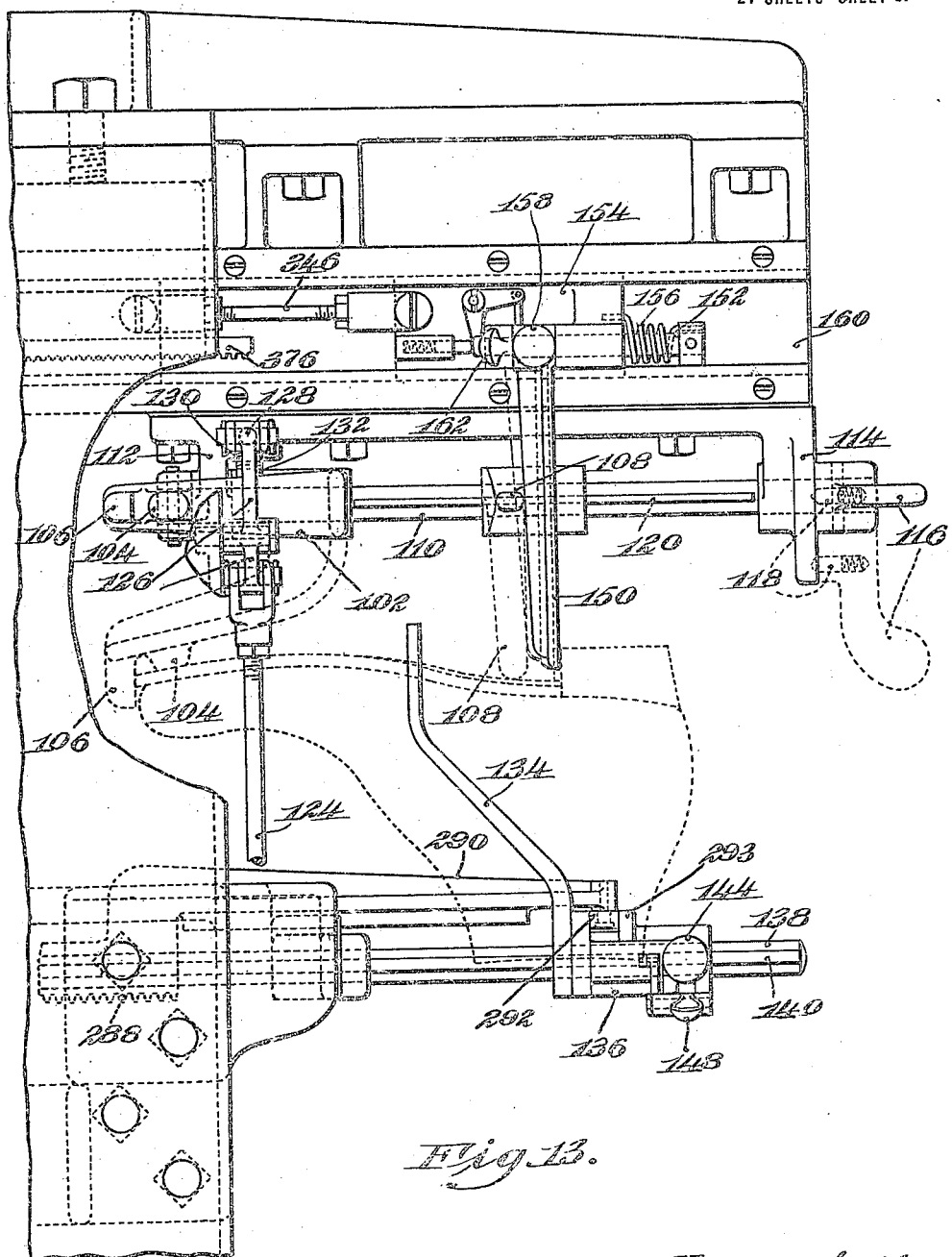
Figure 14:
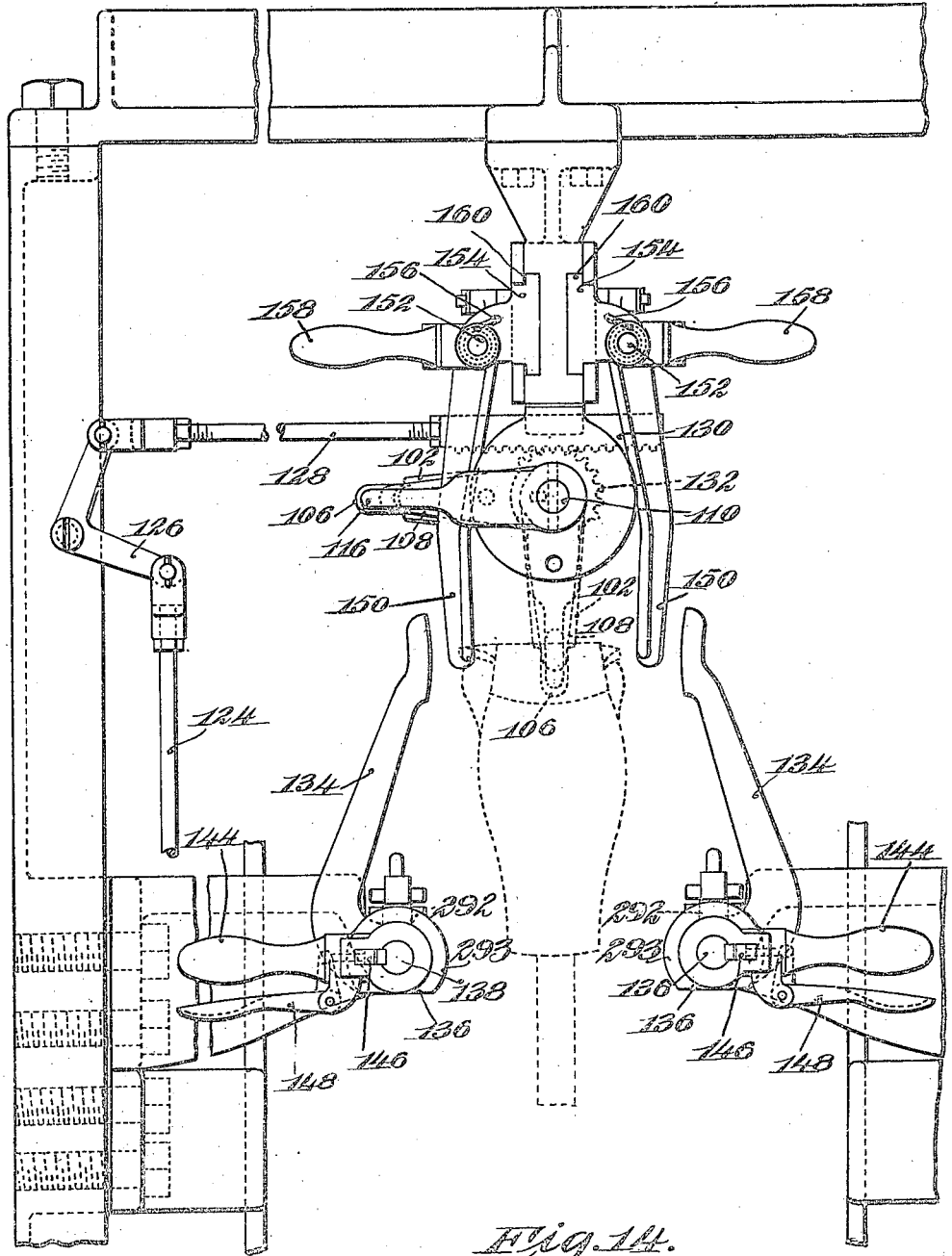
Figure 15:
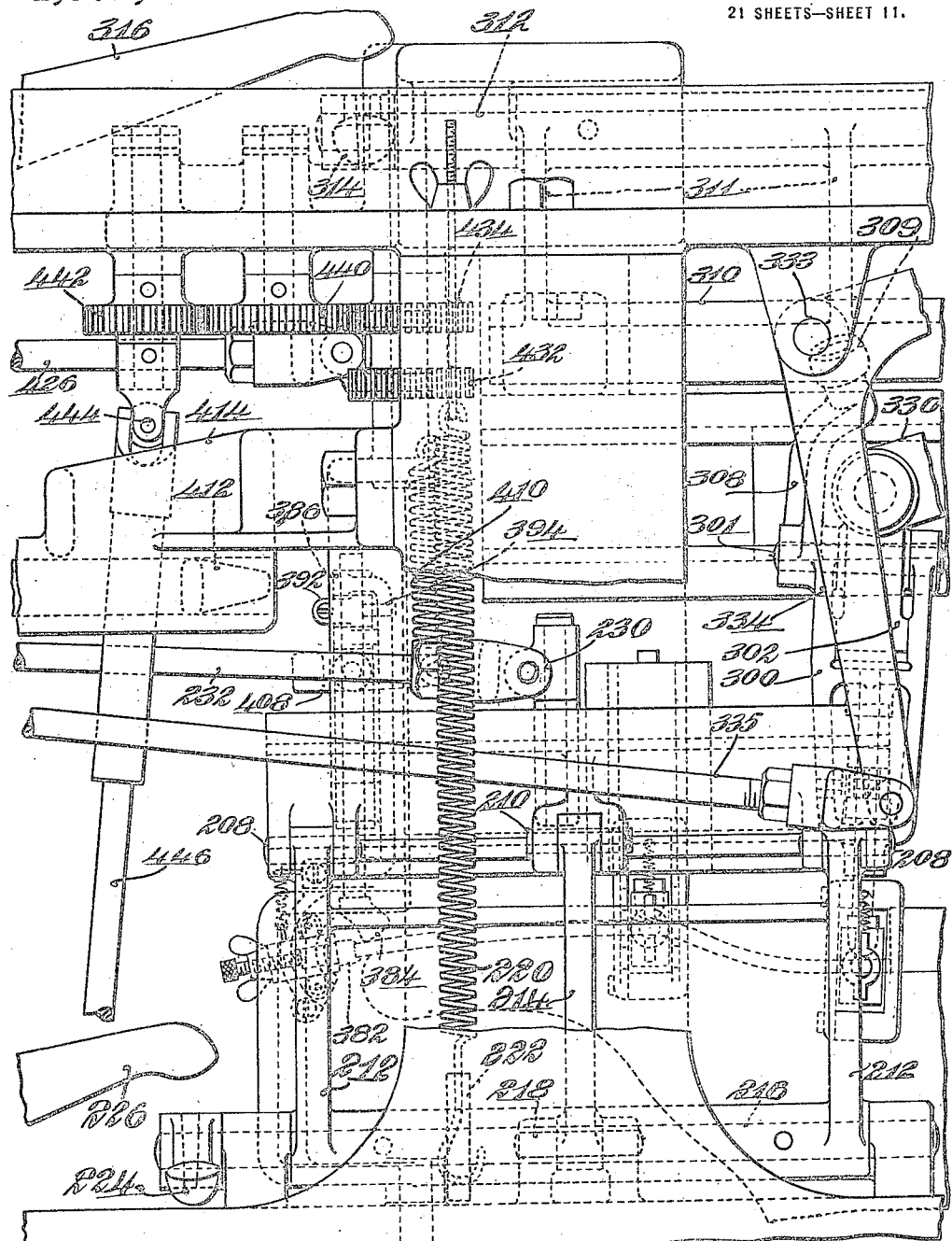
Figure 16:
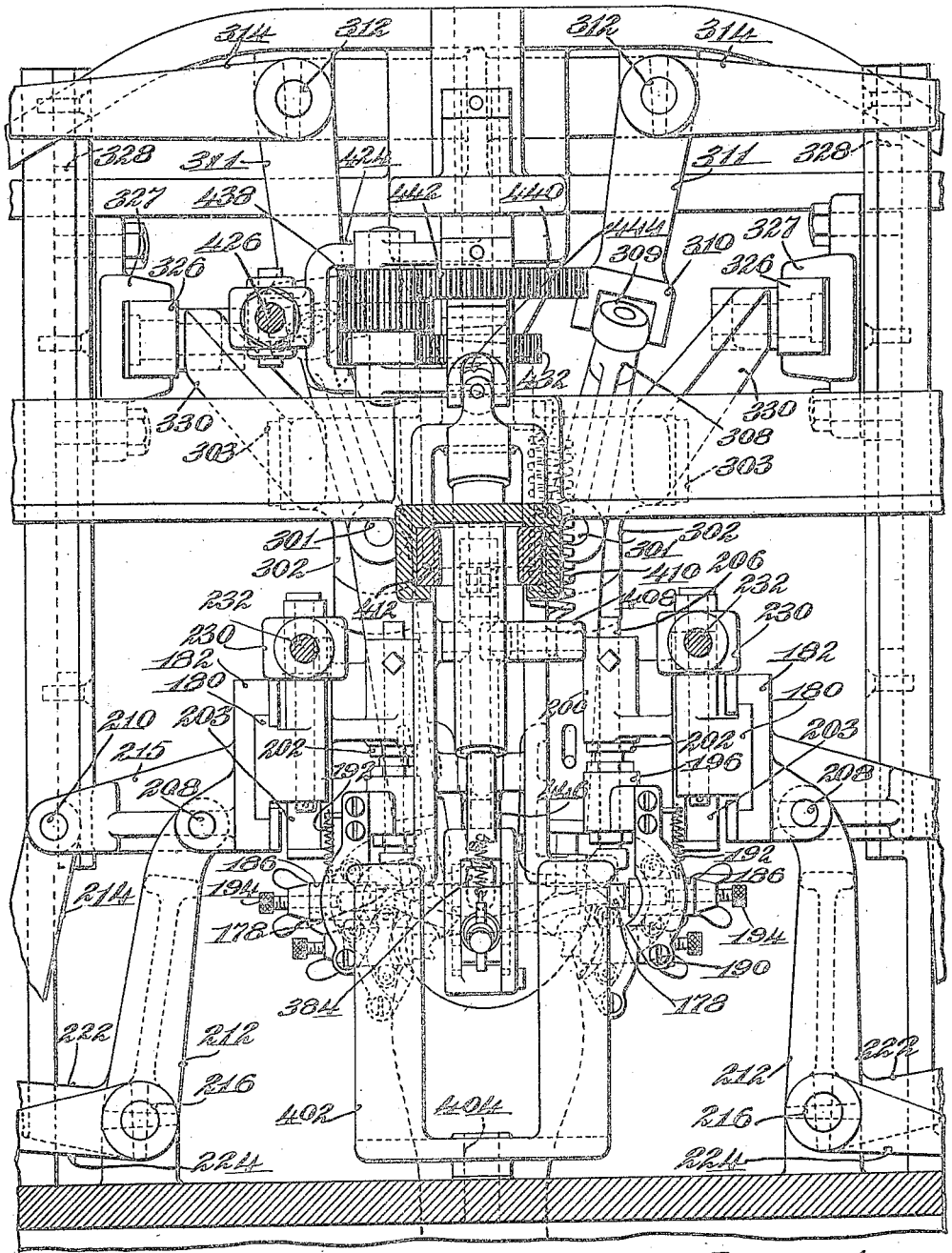
Figure 17:
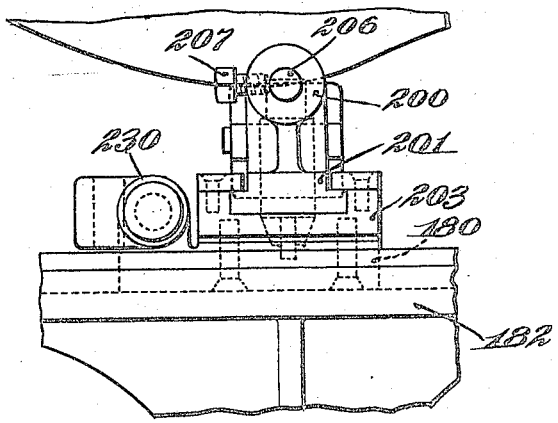
Figure 18:
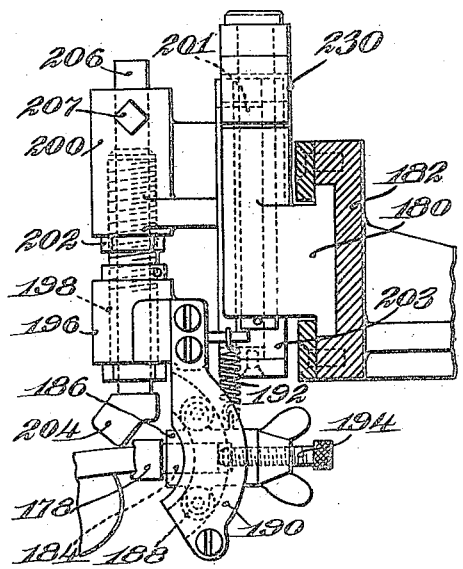
Figure 19:
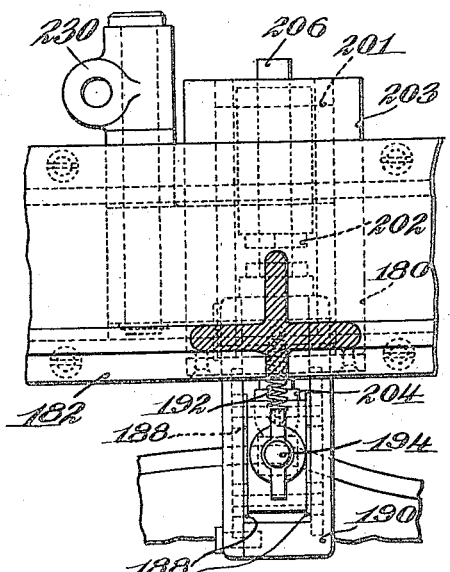
Figure 20:
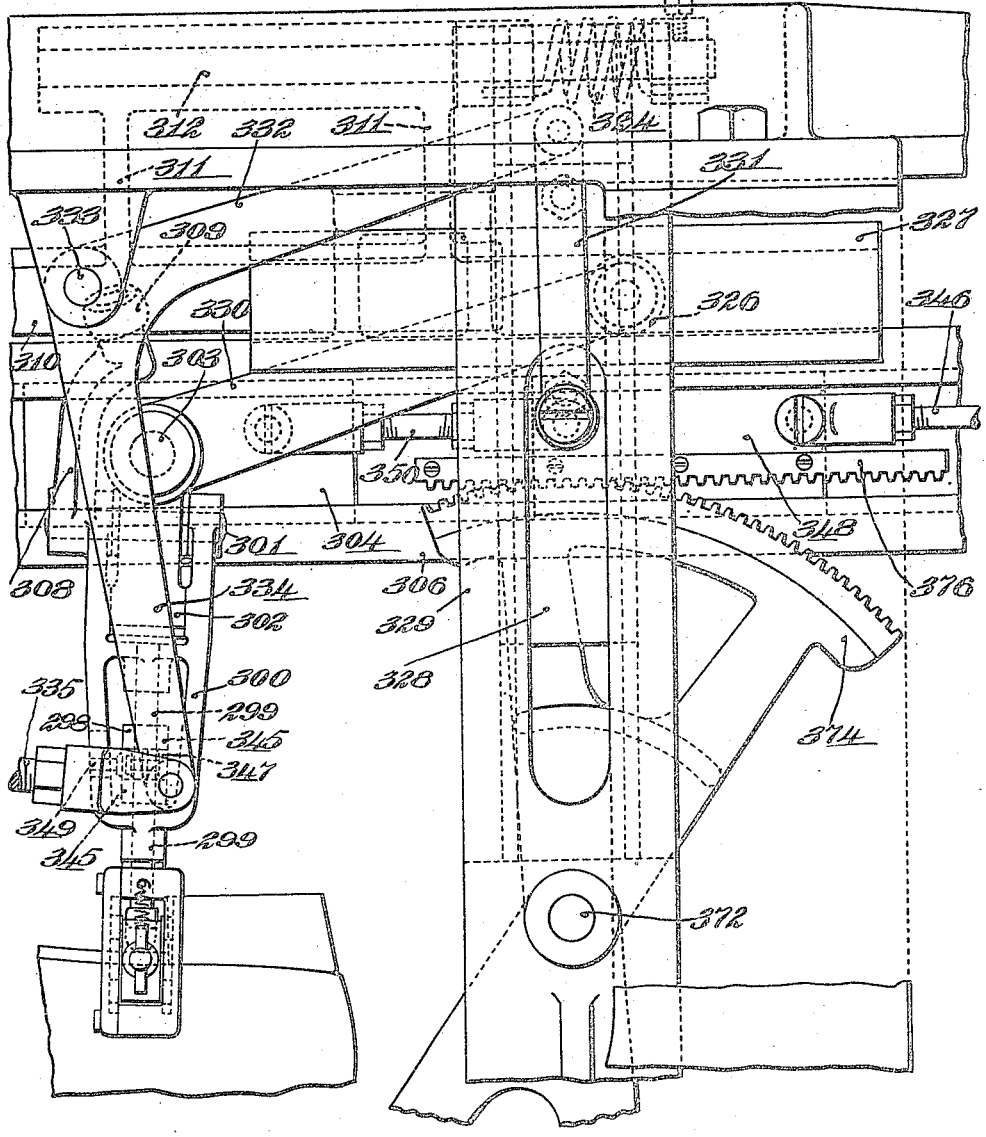
Figure 21:
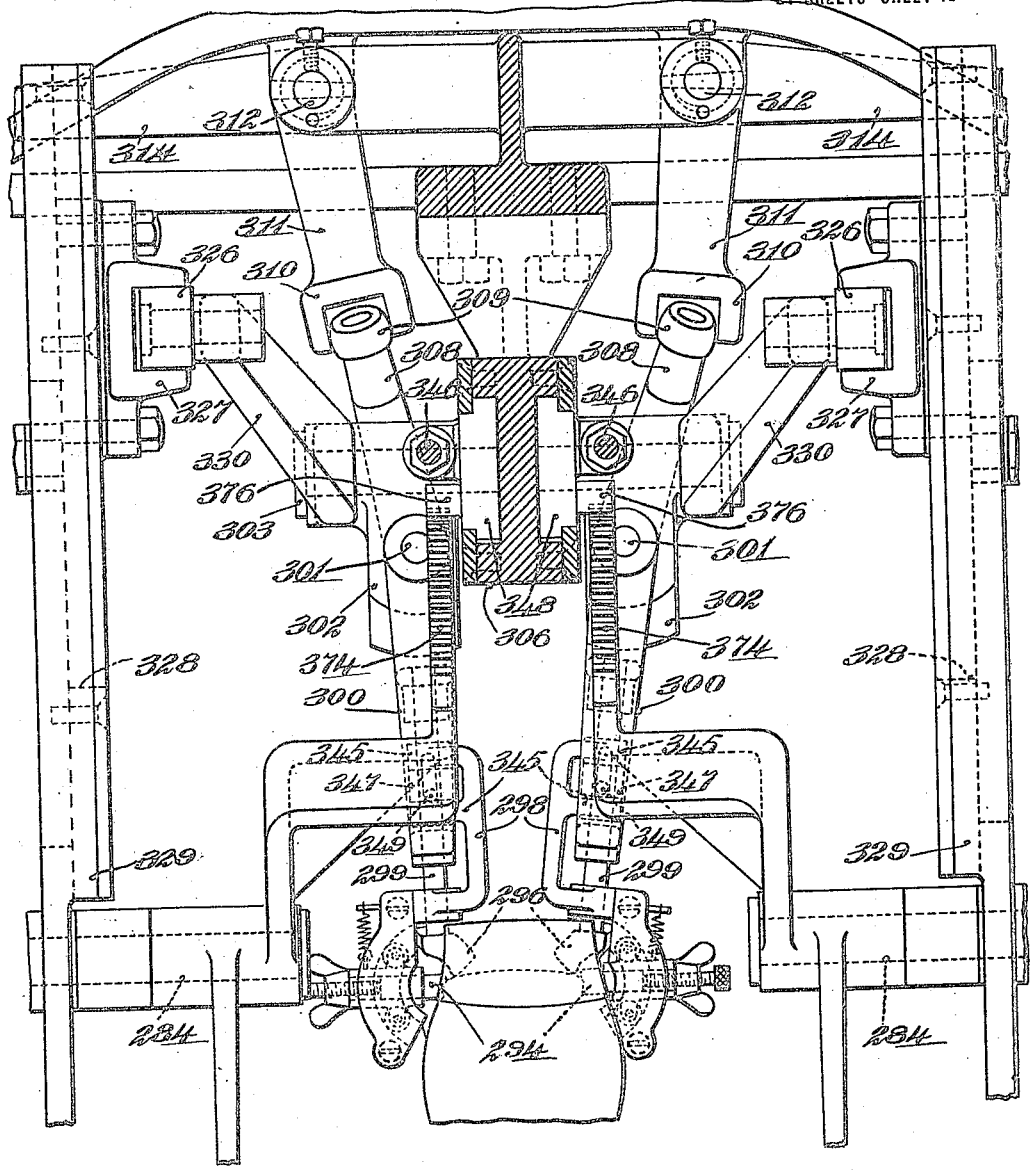
Figure 22:
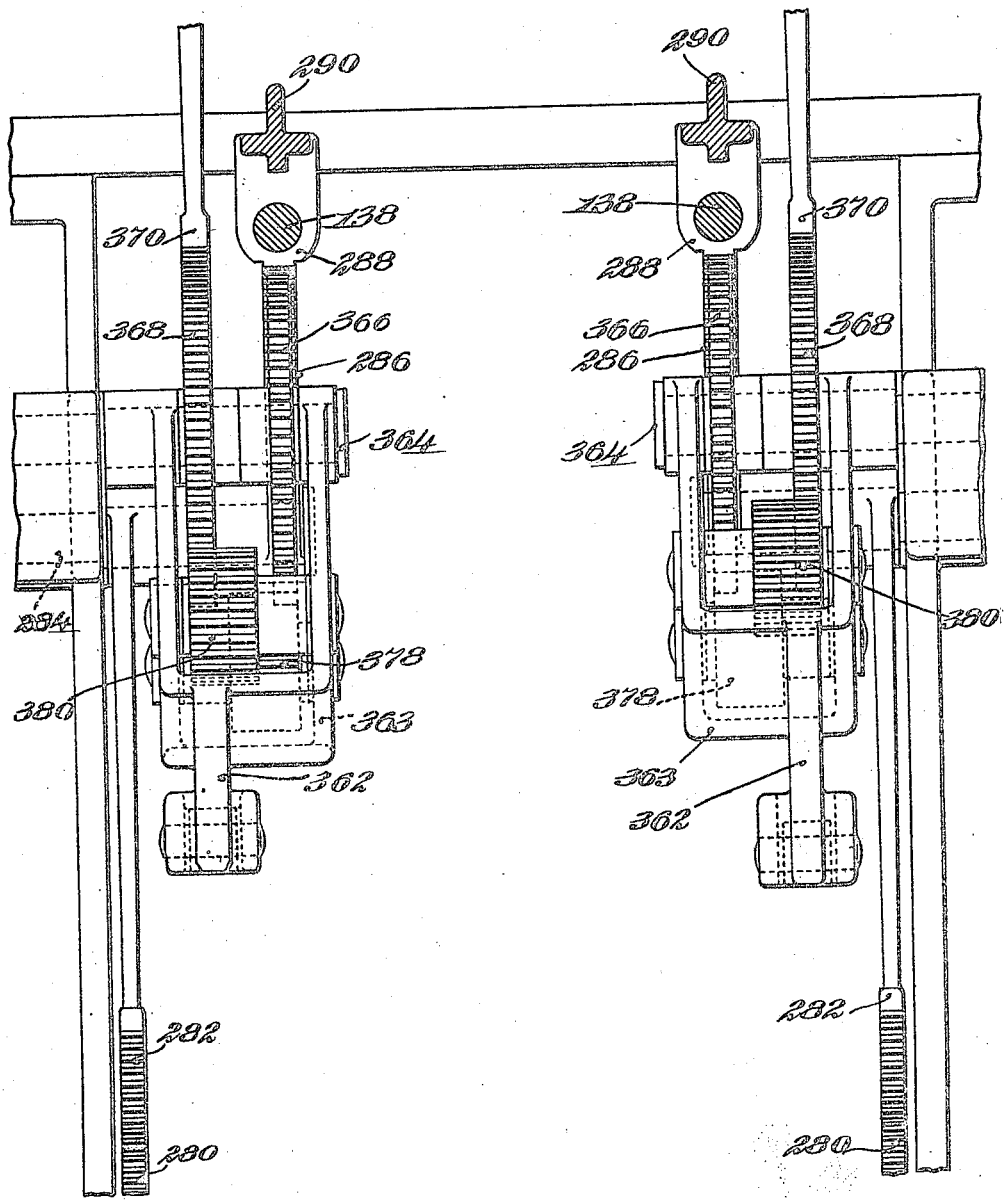
Figure 28:
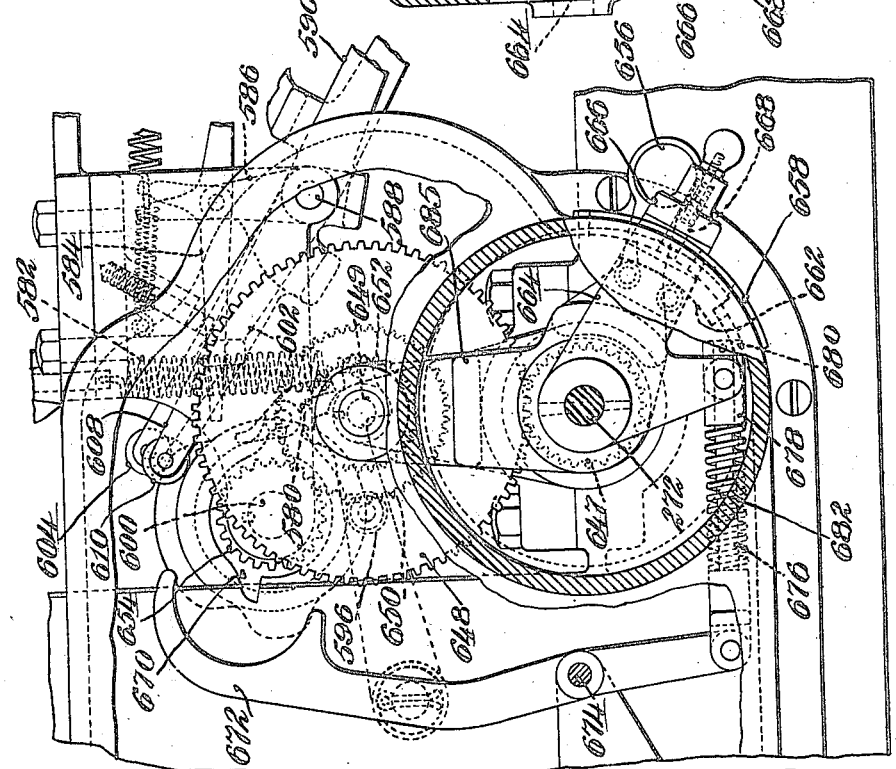

In the accompanying drawings, Figure 1 is a left-hand side elevation of an edge-setting machine embodying the present invention in its preferred form; Figs. 2 and 3 are left-hand side elevations of the upper and lower parts respectively of the machine, on a larger scale and with more detail than Fig. 1; Fig. 4 is a plan view, and Fig. 5 a rear elevation of the entire machine; Fig. 6 is a left-hand side elevation of the shoe-supporting jack, with a lasted shoe supported thereon; Fig. 7 is a front elevation of the jack and shoe; Fig. 8 is a vertical sectional view of a detail of the clamping mechanism of the jack; Fig. 9 is a plan view of the parts of the jack below the section line 9—9 in Fig. 6; Fig. 10 is a right-hand side elevation of a portion of the jack, including the clamping lever; Fig. 11 is a plan view, and Fig. 12 an inside elevation, of the clutch for fixing the jack in its adjusted fore-and-aft positions; Fig. 13 is a left-hand side elevation of a part of the machine, including particularly the gaging devices; Fig. 14 is a front elevation of the same parts; Fig. 15 is a left-hand side elevation of a part of the machine including particularly the mechanism for supporting and actuating the edge-setting tools, and Fig. 16 is a rear elevation of the same parts; Fig. 17 is a plan view of the mechanism for supporting and immediately actuating one of the fore-part tools, Fig. 18 is a rear elevation, and Fig. 19 a side elevation of the same parts; Fig. 20 is a left-hand side elevation of the mechanism for supporting and immediately actuating one of the shank tools; Fig. 21 is a front elevation showing the supporting and actuating mechanism for both of the shank tools; Fig. 22 is a front elevation, and Fig. 23 a left-hand side elevation of the differential mechanism for controlling the length of the path of movement of the shank tools; Fig. 24 is a plan view of the mechanism for supporting and immediately actuating the toe tool; and Figs. 25 and 26 are respectively a rear elevation and a left-hand side elevation of the same parts; Fig. 27 is a left-hand side elevation of the automatic timing mechanism; Fig. 28 is a left-hand side elevation, and Fig. 29 a front elevation of parts of the timing mechanism, including particularly those associated with the mechanism for producing the traversing movements of the tools; Fig. 30 is a side elevation, partly in vertical section, of the timing mechanism, with various parts removed; Fig. 31 is a side elevation of certain parts of the timing mechanism, particularly those for coördinating the movements of the traverse-producing mechanism and the tool-engagement controlling mechanism; and Fig. 32 is a detail view, in side elevation, of a part of the mechanism shown in Fig. 28.

The invention, as illustrated, is embodied in a machine in which the edge-setting operation is performed upon a lasted shoe, the last and shoe being supported upon a jack during the operation of the machine. The operator places the lasted shoe upon the jack and adjusts it in position with the assistance of gages provided for that purpose, then adjusts the automatic mechanisms of the machine, in accordance with the particular form and size of the shoe, by means of manually operable members or gages which he brings into register with certain points on the shoe, and finally starts the machine in operation by depressing a treadle. The edge-setting operation is then performed by the machine in a complete and entirely automatic manner, the operator having no further function to perform, except the removal of the lasted shoe at the completion of the operation.

The construction of the jack is particularly shown in Figs. 6 to 12 inclusive. Fig. 6 shows an ordinary last upon which a shoe is placed. This last is supported at the after part by means of a heel post 34 having a head 36 pivoted to its upper end, this head being provided with the usual last-pin 38 to enter the socket generally provided for that purpose in lasts. The head 36 is connected with a spring plunger 40 tending to rock it in a direction to press the forepart of the shoe downwardly. The forepart of the shoe and the last is supported by a toe support 42 pivoted on the upper end of a toe post 44.

In the present machine it is necessary to adjust accurately the height at which the shoe is supported, both near the toe extremity and near the heel, and accordingly the heel post and the toe post are arranged to be vertically adjusted independent of each other, and to be clamped in the position to which they are so adjusted. For this purpose, the lower ends of the posts are pivoted to opposite ends of a lever 46, which is supported at the middle of its length on a pivot 48 carried by a hand lever 50. The forward end of the hand lever is formed as a handle, while the rear end is pivoted on a stud 52. This stud is mounted in two parallel plates forming a housing 54 in which the lever 46 is inclosed.

The upper part of the housing is formed, at one side, as a plate 56 (Figs. 7 and 8) against which the heel post and the toe post rest at one side, and on the other side the posts are engaged by a clamp plate 58 which is supported on the opposite side of the housing. The clamp plate is controlled by a hand lever 60, pivoted at one side of the housing on a stud 62, and terminating in a handle at the front of the jack. This clamp lever is provided, at an intermediate point, with a slotted and beveled portion 64 which has a wedging action against a correspondingly beveled collar 66 supported in a U-shaped lug 68 projecting from the housing. A bolt 70 passes through the collar 66 and through openings in the clamp lever and the plates 56—58, and through a flat spring 72 which is seated in a slot in the housing. The ends of this spring rest against the clamp plate 58, and when the clamp lever is depressed it causes the collar to pull on the bolt and thus force the spring against the clamp plate so as to clamp the two posts securely in their adjusted positions. To retain the clamp lever in its operative position it is provided with a latch 74 coöperating with a notched sector 76 fixed on the housing.

The jack is carried by a slide 78 which is moved for the purpose and by the means hereinafter described. Since the slide is moved always to a definite position in bringing the shoe to operative position with respect to the edge-setting tools, provision is made for adjusting the longitudinal position of the jack on the slide 78, in order that the position of the shoe with respect to the tools may be adjusted for shoes of different lengths. Accordingly, the housing of the jack is provided with a base in the form of a slide 80, which moves in dove-tail guideways on the top of the slide 78. The slide 80 is fixed in its adjusted position on the slide 78 by a clutch comprising a longitudinal flat flange 82 on the slide 78. Coöperating with this flange are two friction rollers 88, which are mounted in recesses 86 in a block 84 fixed to the side of the jack housing. The recesses have oppositely inclined bottoms, as shown in Fig. 11, and the rollers are pressed by springs 90 in directions to cause them to pinch between these inclined bottoms and the flange 82, one roller acting in each direction of movement of the slide 80, so that when the clutch is in operation the slide is held against movement in either direction. To permit adjustments of the parts, however, two follow blocks 92 are mounted in a longitudinal recess in the clutch block 84, these follow blocks being adapted to engage the friction rollers at their outer ends, and resting at their inner ends against a square portion on a rock-shaft 96 which is journaled in the housing. Fixed to this rock-shaft is an arm 98, which is connected by a link 100 with the clamp lever 60. When the clamp lever is raised to release the jack posts the arm and the rock-shaft are turned, and the square part 94 causes the follow blocks to engage the friction rollers and press them away from their operative positions.

The position in which the lasted shoe is held by the jack is determined by the operator, with the assistance of a toe gage 102 and a shank gage 108, into engagement with which the sole of the shoe is brought in adjusting the jack, as shown in Fig. 6. The toe gage has an abutment 104 adapted to determine the height of the bottom surface of the shoe sole at a point approximating the center of curvature of the toe extremity of the sole, and it has also an abutment 106 adapted to engage the edge of the toe end of the sole. The shank gage 108 is adapted to engage the bottom surface of the shank portion of the sole and to determine the height of this portion at a point close to the breast of the heel.

Since it is necessary to move the gages out of operative position to permit the shoe on the jack to be moved rearwardly into position for the edge-setting operation, the gages are mounted, as shown in Figs. 13 and 14, on a rock-shaft 110, which is supported in horizontal position in hangers 112 and 114 depending from a part of the fixed framework of the machine. A handle 116 is fixed to the forward end of the rock-shaft, by means of which the shaft may be turned to swing the gages into their depending operative position, shown in dotted lines in Figs. 13 and 14, or into their horizontal inoperative position, as shown in full lines. A spring-pressed detent 118 in the handle 116 serves to retain the parts in either position. The toe gage is fixed on the rock-shaft, because the longitudinal position of the toe extremity of the shoe must always be the same regardless of the length of the shoe. Since this necessitates a longitudinal adjustment of the shank gage, to compensate for variations in the lengths of the shoes, the hub of the shank gage is mounted to slide loosely on the rock-shaft, but is caused to turn therewith by a key 120 on the shaft.

To avoid dependence on the operator in the matter of removing the gages from working position prior to the rearward movement of the jack, the mechanism just described is connected with that by which the machine is thrown into operation. A treadle 122 (Figs. 1 and 3) is employed for the latter purpose, this treadle being mounted on a rock-shaft 170 near the front of the machine, and being normally held in raised position by a spring 123. A rod 124 passes loosely, at its lower end, through an opening in a lug on the side of the treadle lever, and the upper end of this rod is connected, by a bell-crank lever 126 (Figs. 13 and 14) with a rod 128 fixed to a rack 130. The rack slides in a bearing in the hanger 112, and engages a pinion 132 fixed on the rock-shaft 110. Accordingly, when the treadle 122 is depressed to start the machine, the rock-shaft is turned so as to throw the gages into inoperative position unless this has previously been done by the operator.

The form imparted to the sole edge by the edge-setting tools is usually different in the shank and in the forepart of the sole, and the the present machine is, therefore, provided with different tools for working upon these parts of the sole. Owing to these differences in form, it is important that the range of operation of each tool shall be accurately limited, although there should usually be enough overlap at the ends of the parts of movement to blend the two parts of the edge smoothly together at their juncture. This accuracy is required particularly in the case of a shoe having a pronounced angle at the junction of the shank and the forepart of the sole.

The last operation upon the edge of the sole prior to the edge-setting operation is the trimming operation, which is usually controlled manually so that more or less variation occurs in the shape of the sole as a result of a greater or less amount of material being removed. As between any two shoes, therefore, although of the same size and style, there are numerous opportunities for slight differences, so that for the best results it is necessary to adjust the machine prior to operation on each individual shoe, whether right or left, in accordance with the actual length of the shank and forepart of the sole.

Referring to Fig. 6, the forepart $a$ and the shank $c$ of the shoe sole may be considered as meeting at a line $d$ coincident with what is commonly termed the "ball" of the shoe, at which there is a more or less pronounced angle or a pronounced change in the curvature, and the machine should be so adjusted that the forepart tool shall not work to any substantial distance beyond the line $d$ in one direction, or the shank tools to any substantial distance beyond the line $d$ in the opposite direction. It is equally important that the shank tools shall work quite up to the breast of the heel, but no farther, in order that they may set the shank edges completely without marring the heel. Accordingly, the present machine is provided, as before stated, with gages by means of which its operating mechanisms are adjusted, two of these gages being arranged to be set or adjusted by relation to the lines $d$ on opposite sides of the shoe, and two others to the two points where the shank of the sole meets the breast of the heel on opposite sides.

The gages which are set in accordance with the lines $d$, and which may be designated as the "ball gages", since they are set in accordance with the position of the ball of the shoe, are in the form of two arms 134 projecting upwardly alongside the position in which the shoe is placed on the jack, as shown in Figs. 13 and 14. Each of the ball gages is fixed on a sleeve 136, which slides on a rock-shaft 138, but is caused to turn therewith by a key 140 on the shaft. The two rock-shafts are journaled in horizontal position in bearings on the frame of the machine, and at the rear end of each shaft is a coiled spring 142 (Fig. 2) which tends to turn the shaft in a direction to swing the gage outwardly into the normal inoperative position of Fig. 14. To facilitate the manipulation of the gage, a handle 144 projects from each sleeve 136. By means of this handle the gage is rocked into engagement with the sole edge, and then moved in a fore-and-aft direction until it registers with the proper point on the sole. The sleeve is then locked in its adjusted position on the rock-shaft by means of a clutch 146 (Fig. 14). The particular construction of this clutch is not illustrated, as it may be substantially similar to the clutch shown in Figs. 9 and 10, and previously described, but a release lever 148 is shown as associated with the handle 144, this lever being pressed to render the clutch inoperative and thus release the sleeve when it is to be adjusted on the rock-shaft. After the ball gages have been adjusted they remain fixed in their longitudinal position on the rock-shafts 138 until set for another shoe, but upon the release of the handles 144 they are swung away from the shoe to the position shown in Fig. 14.

Another pair of gages is employed, which may be termed the "heel gages." They are in the form of arms 150 which are fixed to and depend from horizontal stems 152 arranged to turn in bearings in two slides 154. Springs 156 coiled around the stems tend to swing the gages outwardly to the position shown in Fig. 14, but by means of handles 158 they may be swung inwardly into engagement with the shoe, and may also be moved in a fore-and-aft direction, together with the slides 154 which move in horizontal guideways 160 on the frame of the machine. Each slide is provided with a clutch, (not shown) of any suitable form for fixing it in adjusted position in the slide guide, a release lever 162 being associated with each handle to control the corresponding clutch. The operator grasps the release levers and the handles, and then swings the lower ends of the gages inwardly and moves them in a fore-and-aft direction, so as to bring each gage into engagement with one of the forward angles of the heel adjacent the extremity of the shank portion of the sole, and in this way the limits of the ranges of operation of the shank setting tools are determined through connections which will be described later. Having made this adjustment, the operator releases the release levers and the handles, thus causing the slides 154 to remain fixed in adjusted position, while the gages are swung outwardly from the shoe.

The foregoing operations complete the preliminary setting of the machine, and its operation thereafter is performed automatically upon the depression of the treadle 122. The first automatic operation is the rearward movement of the jack to carry the shoe into operative relation with the edge-setting tools. For this purpose the jack-supporting slide 78 moves on a horizontal slide guide 164 (Figs. 2, 3, 6 and 7) and is provided with a depending vertical slide guide 166 which receives a block pivoted in the upper end of a lever 168. This lever is mounted, at its lower end, on a rock-shaft 170, and is connected, by a pitman 172, with a crank 174 on a crank shaft 176. On alternate half rotations of the crank shaft the slide is moved from one position to the other, and these half rotations of the shaft are produced and controlled by automatic mechanism hereinafter described.

The forepart setting tools and the means for supporting and actuating them are shown particularly in Figs. 15 to 19 inclusive. Each forepart tool 178 is in the form of a small block having a working face shaped to produce the required form of surface on the sole edge, and this tool is supported by intermediate devices from a slide 180 movable horizontally in a slide guide 182 located alongside the working position of the shoe.

Owing to the variations in the forms of the shoes to be operated upon, provision is necessary for universal adjusting movements, both angular and translative, in the tool, to cause its working face to conform accurately to all the various curvatures and inclinations which are encountered, and to avoid the necessity of preliminary adjustment of the machine in this respect, the tool is so supported that it can move automatically to conform to the shoe sole in consequence of the pressure of its face against the sole-edge. To accommodate the tool to longitudinal vertical curvature and inclination in the sole-edge, the tool is provided with a round shank 184 which turns loosely in a sleeve 186. The sleeve has a substantially horizontal position, but as there may be a slight variation in the vertical inclination or bevel of the sole edge the sleeve is arranged to rock vertically around an axis substantially coincident with the middle of the face of the tool. For this purpose the sleeve is provided with anti-friction rollers 188 which travel in circularly curved slots in a guideway 190. The weight of the sleeve is counterbalanced by a spring 192 connected with the sleeve and with a pin fixed in the guideway, so that the sleeve may be rocked with equal facility above or below its normal horizontal position.

To permit the tool to accommodate itself to the various angles and curves encountered in the outline or contour of the sole, the guideway 190 is fixed to a sleeve 196 which turns loosely upon a vertical stem 198, of which the axis is substantially coincident with the working face of the tool, the sleeve being confined against longitudinal movement by collars on the stem. The stem is screwed into a sleeve 200, and may be turned to provide vertical adjustment for the tool, and locked in adjusted position by a lock nut 202. This vertical adjustment is for the purpose of regulating the height of the tool when out of engagement with the work, to insure its proper engagement with the work when moved toward the latter in a horizontal direction by the means hereinafter described. It may be noted here that this engagement occurs at the rear extremity of the path of movement of the forepart tool, that is to say, adjacent to the toe end of the shoe, and since the height of the shoe sole at this point is accurately determined by the preliminary engagement of this part of the sole with the abutment 104 on the toe gage, in the performance of the jack adjusting operation previously described, the height of the parts of the sole-edge with which the forepart tools are first brought into engagement is substantially constant, regardless of variations in the sizes and shapes of the various shoes operated upon, so that usually a single adjustment of the height of the tools with respect to the slides 180 suffices for all cases. In order that the tool may be adjusted to bring and maintain its working face accurately in register with the axes of pivotal movement, the stem 184 has a thrust-bearing at its rear end against an adjusting screw 194.

Associated with each forepart tool is a finder 204 having a beveled extremity located just above and inside of the tool, so that by adjusting the tool slightly lower than the point of engagement with the sole-edge the beveled surface of the finder may be caused to engage the edge first when the tool is moved toward the work, and thus to raise the tool slightly into alinement with the edge. To permit this rising movement, and to enable the tool to accommodate itself by vertical movement to the curvature of the sole, the sleeve 200 is carried by a slide 201 movable vertically in a slide guide 203 on the slide 180. During the travel of the tool along the sole edge the end of the finder acts as a sole gage for maintaining the tool substantially in vertical alinement with the sole edge.

To provide such relative vertical adjustment of the finder and the tool as may be necessary, the shank 206 of the finder is seated in a central perforation in the stem 198 and the sleeve 200, and fixed in adjusted position by a set screw 207.

The constructions above described provide for all of the self adjusting movements of the forepart tool, except the horizontal lateral movement necessary to accommodate it to the varying widths of the portions of the shoe soles operated upon, and this horizontal movement is provided for by the manner in which the slide guide 182 is supported. As shown particularly in Figs. 15 and 16, each slide guide is provided with longitudinally disposed pivots 208 and 210 carried by outward projections from the slide guide and lying in the same horizontal plane at different distances from the guide. The pivots 208 form points of attachment for two arms 212, which are integrally connected by a web so as to remain always parallel, and which are fixed at their lower ends on a rock-shaft 216 journaled on the frame of the machine. The pivot 210 on each slide guide forms the point of attachment of the upper end of a distance arm 214 which is pivoted, at its lower end, on a pivot 218 which is supported on the frame of the machine, and since the pivot 218 lies in the same plane as the rock-shaft 216, and its distance therefrom equals the distance between the pivots 208 and 210, the slide guide is movable in a substantially horizontal direction toward and from the shoe, while being held always in parallel positions.

The work-engaging movement of each slide guide 182 is produced, and the pressure of the tool against the work is regulated, by a spring 220 (Figs. 5 and 15) which is attached to an arm 222 projecting outwardly from the hub of the arms 212. The movement of the slide guides in the opposite direction, to disengage the tools from the work, is produced positively. For this purpose an arm 224 projects outwardly from the rear end of each of the rock-shafts 216, and is in position to coöperate with the forward end of an arm 226. As shown in Fig. 2, the arms 226 are mounted on a rock-shaft 228 journaled transversely on the frame of the machine, and by means which will be described hereinafter, this rock-shaft is turned at suitable times in the operation of the machine to cause the arms 226 to depress the arms 224.

The operative movements of the forepart tools along the sole edge comprise a rapid vibratory movement of small amplitude to which the burnishing action of the tool is particularly attributed, and a slower continuous traversing movement by which the tool is caused to progress along the sole edge between the predetermined limits, namely, from the toe to the junction between the forepart and the shank of the sole, and back again. Both of these movements are produced by moving the slides 180 in the slide guides 182, each slide being connected for this purpose, by means of a universal joint 230, with a rod 232. The rod extends rearwardly, and its rear end is connected by a second universal joint 234 with a bell-crank lever 236 pivoted upon a stud 237 carried by the upper end of a lever arm 238. The arms 238 are mounted on a shaft 240 journaled transversely in the frame of the machine, and the shaft turns loosely within these arms. There are four arms corresponding in form and in mode of operation to the arms 238, and each of these four arms carries a bell-crank lever at the top, as shown particularly in Fig. 4. Each of the bell-crank levers is connected, by a screw stud 241, with an eccentric rod 242 having an eccentric strap at its lower end, and each of the eccentric straps engages an eccentric 246 fixed on and rotated by the shaft 240. The shaft is connected by gears, including an idler pinion 248, with a gear 250 fixed on the power shaft 252 of the machine, this shaft being provided with a pulley 254 by which it may be connected with any suitable source of power, and being rotated constantly. The rotation transmitted to the shaft 240 causes the eccentric mechanism to rock the bell-crank levers 236, and since the arms 238 are prevented, by means hereinafter described, from rocking freely on the shaft 240, this results in a reciprocating movement of the rods 232 and the slides 180, which movement is transmitted to the forepart tools. The amplitude of these burnishing movements may be regulated by moving the screw studs 241 to various positions in the slotted arms of the bell-crank levers to which they are connected, as shown in Fig. 2.

The traversing movements of the forepart tools are produced by swinging the arms 238 upon the shaft 240. For this purpose each arm 238 is rigidly connected with an arm 256, from which a link 258 depends to a slide block 260, these slide blocks being mounted respectively in circularly curved guideways formed on opposite sides of a lever arm 262. The arm is pivoted on a rod 264 and is rigidly connected with an arm 266 which is provided, as shown in Fig. 3, with a roller 268 at its lower extremity. This roller engages a cam 270 which rotates upon a shaft 272, and the cam is suitably formed to cause a long slow forward movement of the forepart tools, followed by a similar return movement, at each cycle of operations of the machine. The mechanism for throwing the cam 270 into and out of operation at the proper times constitutes a part of the automatic timing mechanism described hereinafter. It will be apparent that the slow swinging movement of the arms 238 incident to this traversing movement of the tools, in no wise interferes with the burnishing movement produced through the bell-crank levers 236.

The purpose of the slide blocks 260 and their curved guideways is to adjust the mechanism so as to regulate the amplitude of the traversing movements to the length of the shoe sole from the toe to the ball. When the forepart tools are at the beginning of the traversing movement adjacent the toe of the shoe, the lever arm 262 is in its raised position, and at this time the guideways in it are concentric with the pivotal connections between the links 258 and the arms 256, so that, regardless of the positions of the slide blocks in the arms 262, the arms 238 are both in similar positions, and thus for all shoes the position of the toe end of the path of movement of the forepart tools is the same, this relation being determined by the location of the toe of the shoe, as previously described, alike for all shoes by the use of the toe gage. The only adjustment necessary, therefore, is in relation to the length of the forward movement by which the forepart tools progress to the ball of the shoe, and this provision is made by sliding the blocks 260 to different positions on the lever arm 262.

For the foregoing purposes, each block 260 is connected, by a rod 274, with one of two similar rack bars 276, these bars being arranged to slide in inclined guideways 279 on the frame of the machine. Each rack bar engages one of two pinions 280 journaled in the frame of the machine, and the pinions coöperate with two segmental gears 282 which turn on a rod 284. Fixed to each gear 282 is a segmental gear 286 which meshes with a rack bar 288, and these rack bars are arranged for convenience to slide upon the after parts of the rock-shafts 138, as shown particularly in Fig. 22. Projecting forwardly from each rack bar 288 is an arm 290, which carries at its forward end a roller 292 (Fig. 13) located between flanges 293 on the sleeve 136 which supports one of the ball gages. Accordingly, the adjusting movements of each ball gage upon its rock-shaft 1 are transmitted, through the various rack bars and gears just described, to one of the rods 274, and thence to the corresponding slide block 260, so as to vary the radius of operation of the lever arm 262 upon the slide block and thus to provide, by the operation of a single cam mechanism, for traversing movements of different amplitudes in the forepart tools, and this adjustment is made wholly by the preliminary setting of the ball gages as above described.

The shank tools and their supporting and actuating mechanism are shown particularly in Figs. 20 and 21. Each shank tool 294 is rockingly mounted in substantially the same manner as in the case of the forepart tools, and is associated with a finder 296 similar to the finders and sole gage 204. The rocking movement of the tool about a vertical axis is provided for by a yoke-shaped carrier 298 which is pivoted on the shank 299 of the finder. Each of these shanks is fixed in an arm 300 pivoted to swing laterally on a stud 301 fixed in an arm 302, this movement about the stud 301 being for the purpose of swinging the shank tool into and out of engagement with the sole edge. The burnishing and traversing movements of the shank tool in a fore-and-aft direction are produced by swinging the arms 300 and 302 about a stud 303 on which the arm 302 is pivoted, this stud projecting laterally from one of two slides 304 which are moved horizontally in a guideway 306 fixed in the frame of the machine.

To swing the arms and the shank tools toward and away from the shoe, an arm 308 is integral with and projects upwardly from each arm 300 and carries a roller 309 at its upper end. Each roller 309 engages a guideway 310, which extends in a fore-and-aft direction and is supported by arms 311 depending integrally from a sleeve fixed on a rock-shaft 312. Each rock-shaft is journaled on the frame of the machine, and is provided at its rear end, as shown in Figs. 2, 4 and 16, with an arm 314. A spring 324, connected with each arm 314 and with the frame of the machine, tends to raise the arms and thus rock the shafts 312 in a direction such as to swing the shank tools into engagement with the sole edge.

The movement of the shank tools away from the work is produced by arms 316 on a rock-shaft 317 which is journaled transversely in the frame of the machine. A third arm 318, fixed to the rock-shaft, is connected with the upper end of a rod 320, and the lower end of this rod is connected with an arm 322 which is fixed on the rock-shaft 228. When the rock-shaft 228 is rocked, so as to throw the forepart tools out of engagement with the work by the action of the arms 226, as before described, the rock-shaft 317 is also turned, so that the arms 316 swing the arms 314 downwardly, and thus throw the shank tools out of engagement.

The mechanism for causing the burnishing movement and the transverse movements of the shank tools is somewhat complicated by the necessity for providing for variations in both limits of their range of movement, since both the ball of the shoe and the heel may be located in different longitudinal positions according to the size and shape of the shoe. Integral with, and projecting forwardly from each of the arms 302, is an arm 330 (Figs. 20 and 21) carrying, at its forward end, a roller 326 which engages a horizontally extending guideway in a bar 327. The bar 327 is integral with a slide 328 which moves vertically in a guideway 329 on the frame of the machine. A link 331 is pivoted at its lower end to the slide 328, and at its upper end to one arm 332 of a bell-crank lever which is mounted on a pivot 333 fixed on the frame of the machine. Each bell-crank lever has a depending arm 334 pivoted at its lower end to the forward end of a rod 335. The rods 335 are pivoted at their rear ends to bell-crank levers similar to the lever 326, and which are pivoted to the upper ends of arms 336 arranged to swing upon the shaft 240. The levers are rocked by the eccentric mechanism previously described to produce the burnishing movements of the shank tools, these movements being transmitted through the rods 335 and the bell crank levers 332—334 to the links 331 and the slides 328, thus causing the bars 327 to rise and fall, and this last movement causes the arms 330 to be swung upwardly and downwardly, regardless of the positions of the rollers 326 in their guideways in the bars 327, so that burnishing movements of constant amplitude are imparted to the arms 300 and the shank tools.

The traversing movements of the shank tools are produced by swinging the arms 336 on the shaft 240. For this purpose each arm 336 is integral with an arm 337 projecting forwardly from the shaft 240, and the arms 337 are connected respectively, by links 338, with slide blocks 339, the slide blocks being mounted in circularly curved guideways in a second lever arm 340 pivoted on the rod 264. The arm 340 is integral with a lever arm 342 which is provided at its lower end, as shown in dotted lines in Fig. 3, with a cam roller coöperating with a cam 344 on the cam shaft 272.

The cam 344 is a double-throw cam. Starting with the shank tools in engagement with the heel end of the shank, where their operation upon the shoe sole begins, they are moved rearwardly to the ball of the shoe, and then back again to the heel, during a half rotation of the cam, and while the forepart tools are performing only their forward transversing movement. Accordingly, the shank tools reach the ball of the shoe and recede from that point before the forepart tools reach it, so that there is no interference between the two sets of tools. After the forepart tools have reached the ball of the shoe, and while they are retreating again toward the toe, the shank tools repeat their excursion. In this way the forms of the shank edges and the forepart edges may be smoothly blended at the points where they join in the ball of the shoe, by causing each tool to slightly overrun the junction point, since the junction will first be acted on by the shank tool, then by the forepart tool, and then again by the shank tool.

The purpose of pivoting the arms 300, by which the shank tools are carried, on centers above the shank of the shoe, is to impart movements to these tools about centers roughly approximating the center of curvature of the shank of the shoe, and to thus diminish the amount of compensation otherwise necessary for the departure of the shanks from a horizontal position.

Since the curvature of the swinging movement of the arms departs somewhat from the vertical curvature of the shoe sole, a slight compensating movement must occur, and this is provided for by arranging the shanks 299 to slide lengthwise in their bearings in the arms 300, the yokes 298 being movable with the shanks. To maintain the finders 296 in proper relation with the tools, each yoke 298 is provided with two parallel arms 345 perforated to receive the shank and embracing a clamp collar 347 fixed on the shank. Since the rotation of the finder and its shank is undesirable, the clamp collar is provided with a pin 349 which moves in a vertical slot in the arm 300, as shown in dotted lines in Figs. 20 and 21.

The lever arm 340, through which the operative movements are transmitted to the shank tools, is so arranged that when it is in its lowermost position the center of curvature of the guideways in this arm coincides with the pivotal connections between the links 338 and the lever arms 337, and, accordingly, whatever the adjustment of the slide blocks 339 in the guideways may be, the extreme upper position of the slide 328 and the guide bar 327 carried thereby is always the same, and the corresponding angular position to which the arms 330 and 300 are moved is always likewise the same. Accordingly, the location of the forward extremity of the path of movement of each shank tool depends upon the position of the slide 304 on which the corresponding arm 300 is pivoted, and the forward and rearward movements of this slide causing corresponding changes in the location. These movements are produced by connections between the slides 304 and the heel gages 150.

As shown in Figs. 2, 13 and 20, each slide 154, on which one of the heel gages is mounted, is connected by a rod 346 with a second slide 348, and the slide 348 is connected in turn, by a rod 350, with one of the slides 304. All of these slides move in the same guideway, and the result of this arrangement is that if the heel gage is moved to exactly coincide with the heel extremity of the shank portion of the shoe edge when the shoe is in the receiving position on the jack, the shank tool will be moved to exactly the same point on the sole edge when the shoe is in the working position.

Since the length of the path of movement of the shank tool depends upon the distance between two points, each having a variable location in the working position of the shoe, namely, the point at the junction between the forepart and the shank, and the point at the heel extremity of the shank edge, the adjustment of the actuating mechanism in the shank tool must be produced by a differential connection between the ball gages and the heel gage. This connection is shown particularly in Figs. 2, 22 and 23. Each of the slide blocks 339 in the lever arm 340 (Fig. 2) is connected, by a rod 352, with an arm 354 pivoted on a transverse rod 356 fixed in the frame of the machine. Connected rigidly with each arm 354 is a depending arm 358, from which a link 360 extends forwardly to an arm 362 integral with a yoke-like frame 363 which is mounted to swing about a pivot stud 364 on the frame of the machine. Two gears 366 and 368 of equal diameter are mounted to turn upon the stud 364, and the gear 366 engages with a portion of the rack 288, which is connected, as above described, with the ball gage. The gear 368 is connected, on the other hand, with the heel gage. For this purpose it meshes with a segmental gear 370, which turns on a pivot 372 on the frame of the machine and is rigid with a segmental gear 374. The gear 374 meshes with a rack 376 fixed to the slide 348. The two gears 366 and 368 in each assemblage are thus positioned respectively by the two gages at one side of the shoe. To transmit the movements of these two gears differentially to the yoke 363 and the arm 362, each yoke is provided with two idler pinions, one of these pinions, 378, meshing with the gear 366, and the other pinion 380 meshing with the gear 368, and these idler pinions are wider than the gears, so that they overlap and mesh with each other at their adjacent portions. It will be apparent that if either of the gears 366—368 is for the moment stationary, and the other gear be rotated, the effect of the gear connections described will be to cause a swinging movement of the yoke and the arm in the direction of rotation of the gear which is moved, but with half the angular amplitude, and that when both bears are rotated the position of the yoke and the arm is the resultant of the two movements. In this way movement is transmitted to the slide blocks 339 so as to secure automatically for each shank tool a range of movement of a length determined by the distance between the corresponding ball gage and heel gage, and since the path of movement is also adjusted, as above described, to begin at the heel extremity of the shank edge, it will necessarily be terminated automatically at the ball extremity of the shank edge.

The toe tool for setting the sole edge around the toe-end of the shoe is shown particularly in Figs. 24, 25 and 26, together with mechanism for supporting and immediately actuating it. The tool 382 has a working face similar to those of the forepart tools, and it is mounted for universal angular adjustment in substantially the same way as the forepart tools and the shank tools. It is also associated with a finder and sole gage 384 in the same manner as the other tools. For angular adjusting movement about a vertical axis the tool is carried by a yoke 386 which turns on the shank 388 of the finder, and to provide for a limited vertical movement this shank is slidably mounted in an upright sleeve 390. To cause the shank and the yoke to move vertically in unison, and thus preserve the proper relative position of the finder and tool, the yoke is provided with arms embracing a clamp collar 392 on the shank 388, and since in this case it is desirable to have the finder turn with the tool, the collar is provided with a pin 394 which moves in a vertical slot in the yoke.

To permit the toe tool to be swung into and out of engagement with the sole, the sleeve 390 is arranged to swing about horizontally disposed trunnions 400 pivoted in the sides of an upright frame 402. The sleeve is swung in a direction to cause and maintain its engagement with the work by means of a spring 410, which is connected at its upper end to the frame 402, and at its lower end to an arm 408 projecting forwardly from the sleeve 390. Movement in the opposite direction is produced by means to be presently described.

The burnishing and traversing movements of the toe tool are produced by rocking the frame 402 about a vertical axis approximately coincident with the center of horizontal curvature of the toe end of the sole. The location of this center obviously will vary more or less with shoes of different sizes and styles, but a sufficient approximation in most cases is secured by so arranging the toe gage that the longitudinal position of the forward extremity of the toe is about one inch beyond the axis about which the frame 402 swings. For the purpose in question the frame 402 is mounted at its lower end on a pivot 404 having a bearing in the frame of the machine, while it is provided at its upper end with a long pivot rod 406 which bears in the frame of the machine, and which serves also as a support for the gears by which the frame 402 is actuated.

For the purpose of throwing the toe tool out of operative position a slide 412 (Figs. 2 and 15) is mounted in a slide guide 414 on a transverse frame member 416, this slide being in position for its forward end to engage the upper end of the yoke 386 when the slide is moved forwardly. The rear end of the slide 412 is articulated with an arm 418 mounted to turn loosely on the rock-shaft 317 and integral with a rearwardly extending arm 420. The arm 420 is connected, by a rod 422, to a forwardly projecting arm 423 on the rock-shaft 228, so that when this shaft is rocked to disengage the forepart tools and the shank tools, it also acts through the connections just described to move the slide 412 into engagement with the yoke 386 and swing the yoke to disengage the toe tool from the shoe.

The mechanism for imparting the burnishing and traversing movements to the toe tool will now be described. A yoke-shaped frame 424 is mounted to swing about the pivot rod 406, as shown particularly in Figs. 24, 25 and 26, and this frame is connected, by a rod 426, with a bell-crank lever 428 (Fig. 2), this lever being connected in turn with a link 430, of which the lower end is pivoted to one of the eccentric straps associated with the shaft 240. By these means a constant slight oscillating movement is imparted to the frame 424. This movement is not transmitted directly to the frame 402, however, as a differential connection is required so as to produce also the traversing movements of the frame 402 and the tool. To this end a gear 432 is fixed to the pivot rod 406, and a second gear 434 of equal diameter is mounted to turn loosely on the pivot rod. Meshing with the two gears are two idler pinions 436 and 438 respectively, these pinions having also overlapping portions which mesh together. The gear 434 meshes with an idler pinion 440 (Figs. 2 and 15) which is journaled on the frame of the machine, and which meshes in turn with a gear 442 also journaled on the frame. The gear 442 is connected, by a universal joint 444, with a rod 446 which extends downwardly and is connected, as shown in Fig. 3, by a universal joint 448 with a vertical shaft 450 which turns in a bearing on the frame of the machine. The lower end of the shaft has a pinion 452 meshing with a segmental gear 454 at the upper end of an arm 456. This arm constitutes part of a bell-crank lever journaled on the frame of the machine and having a rearwardly projecting arm 458 which carries a cam roller 460 working in a slot in a cam 462 mounted on the cam shaft 272. The cam is so formed as to transmit, through the connections just described, the rotative movements by which the toe tool is caused to traverse the portion of the sole edge upon which it acts. This movement is transmitted from the gear 434, through the idler pinions 436 and 438, to the gear 432, and is at the same time and by the same means combined with the oscillating movement of the frame 424, so as to give the toe tool a combined rapid short oscillating motion and a longer continuous and comparatively slow traversing movement. The cam 462 is so formed that at the time when the forepart tools are at the toe extremities of their paths of movement the toe tool is in an intermediate position, so as to avoid interference between the toe tool and the forepart tools.

The operation of the mechanism actuated through the rock shaft 228 (Figs. 2 and 4) for throwing the edge setting tools into and out of operative position, is timed by connection with automatic timing mechanism which will be presently described. For this purpose an arm 464 projecting forwardly from the rock-shaft is connected, by a rod 466, with an eccentric strap 468 (Figs. 3 and 27) which embraces an eccentric on a shaft 470 forming a part of the timing mechanism.

The automatic timing mechanism is driven from the power shaft 252. For this purpose a spiral gear 472 on the power shaft engages a gear 474 on a vertical shaft 476 (Figs. 2 and 3) and the lower end of this shaft is provided with a pinion 478 meshing with a gear 480. The gear 480 turns about the shaft 272, but is not constantly connected with that shaft. As shown in Fig. 30, the gear is annular in form, and is located alongside of a disk 482 turning on the shaft. It meshes with a gear 484 similarly mounted upon the shaft 470. The gear 484 is connected, through an idler pinion 486 turning loosely on a stud 488 on the frame of the machine, with a third annular gear 490 mounted upon the shaft 176.

Each of the gears 480, 484 and 490 constitutes one member of a roller-wedge clutch of the well known Horton type, by which it may be connected at the proper time with its respective shaft to rotate the latter. As shown, for instance, in dotted lines in connection with the gear 480, this gear has an inner smooth surface constituting one of the clutch surfaces, and the inner clutch member 492 is fixed to the shaft and provided with a series of recesses of which the bottoms are inclined to the inner surface of the gear. Friction rollers 494 are interposed between these recesses and the gear, and these rollers are controlled by the usual rotatable controller, comprising a slotted sleeve 496 which turns upon the inner clutch member, and is connected therewith by a spring 498. This spring tends to move the controller in a direction to press the balls toward the shallower ends of the recesses in the inner clutch member, so that they pinch between the inner and outer members. The relative movement of the controller and the inner clutch member is limited by a pin 500 projecting from the controller into a recess in the inner clutch member.

The sleeve 496 is fixed to the disk 482, and for the purpose of throwing the clutch out of operation this disk is provided with a stop lug 502 projecting radially. This lug coöperates with a detent 504 on the end of an arm 506 which is mounted on a pivot stud 508 on the frame of the machine. When the detent is in position to engage the stop, the rotation of the clutch controller is arrested thereby, and the friction rollers are thus thrown to inoperative position, whereupon the inner clutch member and the shaft 272 come to rest.

The construction and mode of operation of the clutches associated with the shafts 470 and 176 of the timing mechanism are substantially similar to those of the clutch just described.

In the cycle of operations of the machine, the shaft 176 is the one first actuated, as it performs the function, through the connections previously described, of retracting the jack from receiving position to operating position. Since this movement is performed by a half rotation of the shaft 176, the stop lug 510 of the clutch thereon is arranged to coöperate with two oppositely arranged detent arms 512 and 514, the latter arm being pivotally mounted on a frame member 515, as shown in Fig. 30. The detent arm 512 is the one which is effective when the machine is out of operation, with the jack in the receiving position. This detent is pivoted at 516 on the frame of the machine, and is integral with an arm 518 pivoted to a sleeve 520 through which a rod 522 slides. This rod is pivoted, at its forward end, to an arm 528 connected with the treadle lever 122, and a compression spring 524 is interposed between the sleeve 520 and nuts 526 on the rear end of the rod. Owing to this arrangement, when the treadle is depressed to start the machine, the detent is drawn downwardly so as to disengage it from the stop lug 510, and the clutch thereupon causes a half rotation of the shaft 176, which is arrested by engagement of the stop lug with the detent 514, as shown in Fig. 30.

The next shaft in order in the timing mechanism, namely, the shaft 470, is that which throws the tools into operative engagement with the shoe sole, and this shaft is accordingly the one which is next actuated. Since it also must make only a half turn at each operation, it is provided with two diametrically arranged stop lugs 534 and 536, both arranged to coöperate with a single detent 538 at the end of an arm 540 which is loosely pivoted on a rock-shaft 542 mounted in the hanger 515. A spring 544 connected with the arm tends to raise the arm and the detent out of operative position, but the arm is provided with an upward projection 546 having a shoulder which coöperates with a latch 548 which is pivoted on a stud 550 on the frame of the machine. A spring 552 connected with the latch, tends to swing it in a direction to engage the shoulder and retain the detent in operative position, as in Fig. 30.

The latch 548 is tripped, to permit the clutch to operate, by the engagement, with an upwardly projecting tail on the latch, of the hook-shaped end of a trip arm 554. This trip arm is pivoted at its forward end on the upper end of an arm 556 constituting one part of a bell-crank lever mounted on a pivot rod 558. The other arm 560 of the lever carries a cam roller 562 which engages a cam 564 fixed on the shaft 176. A spring 574, connected at one end to an arm 576 projecting upwardly from the trip arm 554, tends both to maintain the cam roller in engagement with the cam, and to hold the trip down against the tail of the latch 548. The cam has a single high point, so located that near the end of that half rotation of the shaft 176 by which the jack is moved inwardly to working position, the trip arm is drawn forwardly, thus tripping the latch and causing the detent 538 to be raised so as to release the clutch associated with the shaft 470 and permit a half rotation of that shaft.

To restore the detent into operative position to engage the other stop lug after the shaft 470 has made the half rotation by which tools are moved to operative position, a cam plate is mounted to turn with the shaft 470, this cam plate being provided with a flange 566, shown in dotted lines in Fig. 27, which coöperates with a cam roller 567 journaled on the detent arm 540. This flange is so formed as to swing the detent arm downwardly and thus permit the latch to again engage and retain the detent. In order that the latch may act in this manner, it is necessary that the trip arm 554 shall have previously been disengaged from it, since this trip arm is still held in operative position under the control of the cam 564. Accordingly, the trip arm is controlled by an arm 568 which is journaled on the rod 542 and fixed to an arm 570 (Fig. 27). The arm 570 carries a cam roller 572 which engages a cam on the shaft 470, this cam being so formed as to rock the arms 570 and 568 immediately after the commencement of the half rotation of the shaft, so as to raise the trip arm and release it from the latch and permit the latch to swing back into operative position.

The shaft 272 is the last in order to be actuated, as this is the shaft the rotation of which causes the traversing movements of the edge-setting tools. The detent 504 associated with the clutch on this shaft is controlled by a latch 580 and a spring 582, in the same manner as the detents before described, and the latch 580 is tripped by engagement with the end of a trip arm 584 which is pivoted, as shown in Fig. 31, to the upper end of an arm 586. The arm 586 is pivoted on a rod 588 fixed in the frame of the machine, and is integral with a second arm 590 carrying a cam roller 592. This roller coöperates with a second cam 594 on the shaft 470, this cam having a high point which engages the cam roller just prior to the end of the half rotation of the shaft 470 by which the tools are brought into engagement with the sole edge.

In some cases it is desirable to subject the sole edge to a more prolonged and thorough setting or burnishing operation than in other cases, according to the character and the grade of the shoe which is being operated upon. The minimum extent of the burnishing operation is that resulting from a single rotation of the shaft 272, causing the tools to perform a single cycle of traversing operation. Provision is made, however, in the present machine, for causing the shaft 272 to rotate automatically either once, twice, or three times, as the machine may be adjusted by the operator. Accordingly, the detent 504 is arranged to be thrown back into operative position after it has been released, not by a cam mounted directly on the shaft 272, but by a cam on a countershaft 600 mounted above the shaft 272, as shown in Figs. 27 and 31. The cam in question, designated by the number 598, coöperates with a cam roller 596 on the detent arm 506, and has a high point which depresses the roller and the arm at the completion of each rotation of the shaft 600. The shaft 600 is rotated by gear connections with the shaft 272, which will be described presently.

The latch 580 is released from the influence of the trip arm 584 by raising the latter, as in the case of the trip 554, and for this purpose an arm 602 is pivoted on the rod 588 and provided with a cam roller 604 which coöperates with a cam 606 on the shaft 600.

After the shaft 272 has performed its functions it is necessary to throw the shaft 470 again into operation to cause the tools to be disengaged from the shoe. For this purpose the latch 548 is controlled by a second trip arm 616, which is pivoted on the upper end of an arm 614 mounted on the rod 588. Integral with the arm 614 is an arm 608 carrying a cam roller 610 which engages a cam 612 on the shaft 600, and this cam has a high point so located as to move the cam roller just prior to the completion of the rotation of the shaft 600. Thereupon the shaft 470 makes another half rotation, but it is again arrested by the detent 538 at the end of that movement. The latch 548 is released from the trip arm 616 by a lever, one arm 618 of which carries a roller 620 engaging a cam 622 on the shaft 470, and the other arm 625 of which is arranged to lift the trip arm 616 to free the latch. It is necessary, finally, to impart a half rotation to the shaft 176, to return the jack to receiving position. This is accomplished by a trip arm 630, shown particularly in Fig. 30, which coöperates with the latch 632 which holds the detent 514 normally in operative position. The trip arm 630 is pivoted on an arm 628 mounted on the rod 542, and integral with the arm 628 is an arm 642 carrying a cam roller 626 which engages a cam on the shaft 470. The trip arm 630 is disengaged from the latch by means of a lifter arm 640, which is pivoted on the rod 558 and is integral with an arm 642. The arm 642 carries a cam roller 644 which engages a cam 646 on the shaft 176, as shown in Fig. 27. The detent 514 is raised from operative position by a spring 634, and is returned to operative position by a cam 636, on the shaft 176, which coöperates with a cam roller 638 on the detent. The half rotation of the shaft 176 resulting from the release of the detent 514 is terminated by engagement of the stop lug 510 with the detent 512, and this completes the cycle of operations of the timing mechanism.

Figure 29:
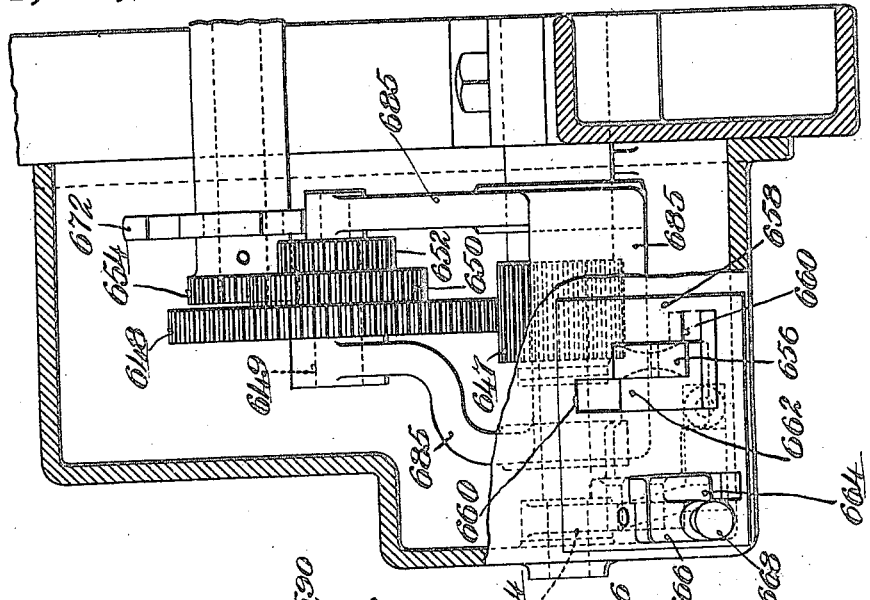

The changeable gearing for connecting the shaft 600 with the shaft 272 is shown particularly in Figs. 28 and 29. A pinion 647 on the shaft 272 meshes with a gear 648 which turns loosely on a stud 649. This stud is carried by arms 685 constituting parts of a yoke-shaped frame which turns loosely upon the shaft 272. Fixed to the gear 648 are two gears 650 and 652, having diameters, respectively, of one-half and one-third that of the gear 648. By moving the yoke 685 along the shaft 272 and rocking it on the shaft, any one of the gears 648, 650 and 652 may be caused to coöperate with the gear 654, and thus cause this last gear to rotate once in one, two, or three rotations of the shaft 272.

For the purpose of so moving the yoke 685, it is provided with an arm 656 which extends outwardly through an opening in a plate 658 forming part of the casing which incloses the gears. This opening has a series of steps 660, at one side, corresponding to the positions occupied by the arm when the several gears are in operative position, and this serves to retain the parts accurately in the several working positions. To hold the arm against the shoulders, a locking plate 662 coöperates with the plate 658, this locking plate having a stepped end which, together with the stepped edge of the plate 658 forms three rectangular openings to receive the arm 656 when the locking plate is in its normal position, as shown in the drawings.

The locking plate is mounted on an arm 664 which rocks upon the shaft 272 and extends outwardly through a slot in the plate 658, terminating in a handle by which it may be manipulated. A spring-pressed detent 668, mounted in a lug 666 at the end of the arm 664, is normallly seated in a hole in the plate 658 so as to retain the locking arm against movement. When the gears are to be shifted the detent is pulled outwardly, and the locking arm is swung downwardly to inoperative position, thus releasing the gear shifting arm 656.

To hold the pinion 654 and the shaft 600 against any accidental movement during the gear shifting operation, and thus prevent the parts from getting out of proper timed relation, a plate 670 is fixed on the shaft 600, this plate having two diametrically located lugs. A lever 672 mounted on a fixed pivot 674 has a forked upper end which coöperates with these lugs when the lever is swung toward the shaft. The lower end of the lever is pivoted to a slide rod 676 which slides through a sleeve 678, this sleeve being pivoted to an arm depending from the locking arm 664. The sleeve 678 normally abuts against a collar 680 fixed on the rod, and a compression spring 682 is interposed between the sleeve and the rear end of the rod. When the shaft 600 comes to rest, in the normal operation of the machine, it always does so with the plate 670 in position to coöperate with the forked end of the lever 672, and when the locking arm is depressed the lever 672 is swung into operative position by the connections above described.

The operation of the machine as a whole is as follows: The operator places the lasted shoe upon the jack and sets the several gages to the proper points on the shoe. He then depresses the treadle, whereupon the jack is retracted to the working position. The tools are then swung automatically into engagement with the sole edges, and caused to traverse simultaneously the shank, the forepart and the toe end of the sole, being at the same time rapidly oscillated to enhance their burnishing effect. After the tools have completed their cycles of movement once, twice or thrice, according as the machine is adjusted, they are automatically thrown out of engagement with the sole, and the jack is then returned automatically to receiving position at the front of the machine. The machine then comes to rest, except for the mechanism for imparting the burnishing movement to the tools, which mechanism acts constantly so long as the power shaft is driven.

While it is preferred to employ the specific construction and arrangement of parts shown and described in embodying the invention in an automatic edge-setting machine, it will be understood that this construction and arrangement is not essential to the broader features of the invention, and may be varied and modified as found desirable or best suited to the construction and mode of operation of the machine in which the invention is to be embodied.

Having explained the nature and object of the invention, and specifically described one form of machine in which it may be embodied, what is claimed is:—

1. A machine for operating on shoes, having, in combination, means for supporting a shoe, and instrumentalities operative automatically to subject the marginal portion of the shoe to an operation upon a predetermined portion thereof, said instrumentalities including a part registerable with said portion of the shoe and being constructed and arranged to permit, between said part and the shoe, a relative movement produced manually as a preliminary operation to predetermine the subsequent automatic operation in accordance with the characteristics of the shoe.

2. A machine for operating on shoes, having, in combination, means for supporting a shoe, and instrumentalities operative automatically to subject the margin of the shoe-sole to an operation upon a predetermined portion thereof, said instrumentalities including a part registerable with the margin of the sole and being constructed and arranged to permit, between said part and the shoe relative movement longitudinally with respect to the shoe, produced manually as a preliminary operation to predetermine the range of the subsequent automatic operation along the sole margin.

3. A machine for operating on shoes, having, in combination, means for supporting a shoe, a tool for acting along the marginal portion of the shoe, mechanism for actuating the tool, operable automatically to cause the tool to act along the shoe margin at a predetermined portion thereof, and a gage, connected with said mechanism and movable manually into registration with the portion of the shoe to be operated on to adjust the mechanism as to the point of operation of the tool.

4. A machine for operating on shoes, having, in combination, means for supporting a shoe in a position predetermined as to one of two limits of a path of operation thereon, and instrumentalities operative automatically, through said path of operation, from said one limit to the other, said instrumentalities including a part movable manually to the other of said limits on the shoe as a preliminary setting operation, and being constructed and arranged to thereafter act automatically to the limit determined by said manual operation.

5. A machine for operating on shoes, having, in combination, means for supporting a shoe with one of two definite points in its sole-margin in a definite position, a tool for acting on the sole-margin between said points, mechanism for actuating the tool, constructed and arranged to move the tool through a range limited always, at one end, by said definite position, but adjustable as to its extent in the opposite direction, and means, for so adjusting the mechanism, comprising a gage movable into registration with the other of said two points on the sole-margin.

6. A machine for operating on shoes, having, in combination, means for supporting a shoe with two definite points in indefinite positions varying with the size and shape of the shoe, a tool for acting on the shoe between said points, mechanism for actuating the tool, adjustable as to both length of the range of operation of the tool, and as to the positions of limits of said range, and means, for so adjusting the tool-actuating mechanism, comprising gaging means movable into registration with both of said points on the shoe.

7. A machine for operating on shoes, having, in combination, means for supporting a shoe, a tool for acting on the sole-margin from the toe-end to the ball, another tool for acting on the sole-margin from the ball to the heel, automatic mechanisms for actuating each of said tools, and means for adjusting said mechanisms independently to vary the range of action of each tool independently of the other.

8. A machine for operating on shoes, having, in combination, means for supporting a shoe with the toe-end in a definite position, an edge-setting tool for acting on the edge of the forepart of the shoe sole, mechanism for actuating the forepart tool automatically, said mechanism being adjustable to vary the range of operation of the tool in a direction away from the toe-end of the shoe, a ball gage for locating the ball of the shoe, connections between said gage and said mechanism for adjusting the latter, an edge-setting tool for acting on the edge of the shank of the shoe sole, mechanism for actuating the shank tool automatically, said mechanism being adjustable to vary the range of operation of the shank tool in both directions, connections between the ball-gage and the shank tool mechanism for adjusting the latter as to the location of the ball of the shoe, a heel gage for locating the heel-end of the shank of the sole, and connections between the heel-gage and the shank tool mechanism, for adjusting the latter as to the location of the heel-end of the shank.

9. A machine for operating on shoes, having, in combination, a work support adjustable to hold each shoe with the toe-end in a definite position, means for moving the work support from a receiving position to a working position, a tool for working on the shoe when in the working position from the toe-end toward the heel-end, mechanism for actuating the tool, and means for adjusting said mechanism to vary the range of operation of the tool on the shoe.

10. A machine for operating on shoes having, in combination, a tool, a gage located in a position remote from the tool, a work support adapted to hold a shoe in a gaging position adjacent the gage, and in a working position adjacent the tool, and movable from one position to the other, and connections between the tool, the gage, and the work support constructed and arranged to control the relative position of the tool and the shoe, when the shoe is in the working position, in accordance with the relative position of the gage and the shoe when the shoe is in the gaging position.

11. A machine for operating on shoes, having, in combination, a shoe support movable from a receiving position to a working position, a tool for acting on the shoe when in the working position, mechanism for actuating the tool operable automatically to cause the tool to operate upon a predetermined portion of the shoe, a gage movable manually into registration with the portion of the shoe to be operated on when the shoe is in the receiving position, and connections between said gage and said mechanism for adjusting the latter as to the point of operation of the tool.

12. A machine for operating on shoes, having, in combination, a shoe support, a tool for operating progressively along a portion of the shoe, mechanism for actuating the tool automatically, including a part having an effective lever arm variable to vary the range of operation of the tool, and means for varying said lever arm comprising a gage movable into registration with one of the limits of the desired range of operation on the shoe.

13. A machine for operating on shoes, having, in combination, a shoe support, a forepart edge-setting tool, a shank edge-setting tool, and independent mechanisms for actuating said tools automatically, said mechanisms being adjustable to vary the ranges of operation of the tools.

14. A machine for operating on shoes, having, in combination, a support for a lasted shoe; an edge-setting tool; and means, for supporting and actuating the tool, constructed and arranged to hold the tool in engagement with the shank-edge of the sole of a shoe on said support and move the tool along the sole-edge by a swinging movement about a center located approximately at the center of vertical curvature of the shank.

15. A machine for operating on shoes, having, in combination, means for supporting and positioning a shoe comprising a longitudinally adjustable shoe-support, and a gage for engaging the toe-extremity of the sole of a shoe mounted on said support, said means being constructed and arranged to position and support the shoe, for operation thereon, with the toe-extremity in a position determined by said gage and irrespective of the length of the shoe; a tool for working on the sole-edge from the toe-end toward the heel-end; and mechanism for moving the tool along the sole-edge, said mechanism being constructed and arranged to move the tool through a path of movement which is constant as to limit at the toe-end of the shoe, but variable, as to length according to the length of the sole.

16. A machine for operating on shoes, having, in combination, a shoe-support adjustable to hold a shoe with a given portion of the sole in a predetermined position regardless of the size of the shoe; an edge-setting tool; and mechanism, for actuating said tool, constructed and arranged to actuate the tool through a path of movement along the sole-edge which begins invariably at said position but is variable, as to length, in accordance with the size of the shoe.

17. A machine for operating on shoes, having, in combination, a shoe support adjustable to hold a shoe with the toe-end and the shank of the sole at predetermined levels, a forepart edge-setting tool, a shank edge-setting tool, and means for supporting and actuating said tools constructed and arranged to move the forepart tool into engagement with the sole edge at the toe-end and the shank tool into engagement with the shank edge adjacent the heel end.

18. A machine for operating on shoes, having, in combination, a forepart edge-setting tool and a shank edge-setting tool arranged to operate simultaneously on the sole edge at one side of a shoe, and mechanism for supporting and actuating the tools, constructed and arranged to move them simultaneously into engagement with opposite ends of the sole edge and then move them to the junction of the forepart and the shank and then back again and to move one tool faster than the other so that the tools will not meet and interfere at said junction.

19. A machine for operating on shoes, having, in combination, a shoe support, an edge-setting tool for operating on a portion of the sole edge of a shoe on said support, and means for supporting and actuating the tool constructed and arranged to move the tool along the sole edge by a swinging movement about a center located approximately at the center of vertical curvature of the portion of the sole edge upon which the tool operates.

20. A machine for operating on shoes, having, in combination, a shoe support, an edge-setting tool, mechanism for holding the tool in engagement with the sole edge of a shoe on the support and for moving the tool in the general direction of the length of the edge, and connections between the tool and said mechanism constructed and arranged to permit the tool to move angularly in every direction to maintain a surface contact with all parts of the edge.

21. A machine for operating on shoes, having, in combination, a shoe support and an edge setting tool relatively movable to transfer the point of operation along the sole edge, and a support on which the tool is mounted for angular movement in every direction.

22. A machine for operating on shoes, having, in combination, means for supporting a shoe, an edge-setting tool, means for moving the tool toward the sole edge of a shoe on the shoe support to engage the tool therewith, said means having provision for accommodating movement of the tool in directions normal to the sole, and a finder associated with the tool and arranged to engage the sole edge in advance of the tool to guide the tool into engagement with the sole edge.

23. A machine for operating on shoes, having, in combination, a tool, a gage for determining the position of a shoe to be operated on by the tool, a support for a lasted shoe adjustable toward and from the gage, means for securing the support in adjusted position, and mechanism operative automatically to transfer the support and the shoe thereon from coöperative relation with the gage to coöperative relation with the tool.

24. A machine for operating on shoes, having, in combination, gages for positioning the toe-end and the shank of a lasted shoe by engagement with the sole bottom, a tool for operating on the shoe so positioned, and a jack for supporting the shoe, comprising a toe-post, a heel-post, manually operable means for moving the posts in the direction of the gages, and means for clamping the posts in the positions to which they are so moved.

25. A machine for operating on shoes, having, in combination, a shoe support, a tool, mechanism for moving the shoe support from a receiving position to a working position, mechanism for moving the tool into engagement with the shoe on the support, mechanism for producing operative movements of the tool when in contact with the shoe, and timing devices operative automatically to throw said mechanisms successively into operation in the order in which they are named.

26. A machine for operating on shoes, having, in combination, a shoe-support adjustable to hold a shoe with the toe-end at a predetermined level regardless of the size of the shoe; an edge-setting tool; and mechanism, for actuating said tool, constructed and arranged to move the tool first into engagement with the sole-edge at the toe-end, and then along the sole-edge from said end to subject the edge to a progressive setting operation.

27. A machine for operating on shoes, having, in combination, a shoe-support; an edge-setting tool; mechanism for holding the tool in engagement with the sole-edge of a shoe on the support and for moving the tool in the general direction of the length of the edge; and connections between the tool and said mechanism constructed and arranged to permit the tool to move angularly about all axes passing through a point lying approximately at the center of the working face of the tool.

28. A machine for operating on shoes, having, in combination, an edge-setting tool; a carrier on which said tool is mounted; a guideway, in which the carrier is movable, curved about an axis lying substantially in the working-face of the tool; and means for counterbalancing the carrier in the guideway.

29. A machine for operating on shoes, having, in combination, a shoe support and an edge setting tool relatively movable to transfer the point of operation along the sole edge, and a support on which the tool is mounted for angular movement in every direction about axes passing through the point of operation.

30. A machine for operating on shoes, having, in combination, an edge-setting tool provided with a shank normal to the working face of the tool; a carrier in which said shank is journaled; a guideway, in which the carrier is movable, curved about an axis lying substantially in the working-face of the tool; and means for supporting the guideway pivotally upon another axis lying substantially in the working face of the tool.

31. A machine for operating on shoes, having, in combination, a shoe support, an edge setting tool mounted to rock about an axis substantially normal to the sole edge and to rock vertically about an axis substantially tangent to the sole edge, a vertically movable carrier in which the tool is mounted, and a sole gage connected with the carrier to maintain the tool substantially in vertical alinement with the sole edge.

32. A machine for operating on shoes, having, in combination, a shoe support, and an edge setting tool mounted to rock about an axis substantially normal to the sole edge, to rock vertically about an axis substantially tangent to the sole edge at the point of operation, and to rock horizontally about an axis passing substantially through the point of operation.

33. A machine for operating on shoes, having, in combination, a shoe support and an edge setting tool relatively movable to transfer the point of operation along the sole, a vertically movable carrier in which the tool is mounted to rock vertically and about an axis normal to the sole edge, and a sole gage connected to the carrier to maintain the tool substantially in vertical alinement with the sole edge.

34. A machine for operating on shoes, having, in combination, gages for vertically positioning the shoe by engagement with the sole bottom, a tool for operating on the shoe, a jack comprising heel and toe posts, means for raising the posts and permitting them to move vertically relatively to each other, and means for locking the posts in position.

35. A machine for operating on shoes, having, in combination, sole gages movable into and out of position to engage the bottom of the shoe sole and a jack comprising heel and toe posts, and means for moving the posts vertically and for locking them in position.

36. A machine for operating on shoes, having, in combination, sole gages for engaging the bottom of a shoe sole, a tool for operating on the shoe, a shoe supporting jack movable from gaging position to operating position, heel and toe posts on the jack, means for raising the posts and permitting them to move relatively to each other, and means for locking the posts in position while the jack is out of operating position.

37. A machine for operating on shoes, having, in combination, a shoe support, a tool, mechanism for moving the shoe support from receiving to working position, mechanism for giving operative movements to the tool when in contact with the shoe, controlling means for the latter mechanism adjustable to vary the number of cycles through which the tool is operated, and mechanism for returning the shoe support after the operation of the tool is completed.

38. A machine for operating on shoes, having, in combination, a shoe support, mechanism for automatically operating along the marginal portion of a shoe supported thereon, and means for gaging the preliminary manual setting of the automatic mechanism by a shoe previously secured on the support.

39. A machine for operating on shoes, having, in combination, a shoe support, means for automatically operating on a shoe along the marginal portion of the support, and means adapted to be brought by the operator into register with a shoe on the support to effect a preliminary setting of the automatic means.

40. A machine for operating on shoes, having, in combination, a shoe support movable from receiving to working position, means for automatically operating on a shoe on the support when in working position, and a gage adapted to be brought by the operator into register with the shoe on the support when in receiving position and connected with the automatic means to effect a preliminary setting thereof corresponding to that shoe.

41. A machine for operating on shoes, having, in combination, means for supporting a shoe, instrumentalities operative automatically to subject the marginal portion of the shoe to an operation by said instrumentalities including a part which may be manually brought into register with the margin of the shoe by relative movement between the shoe and part preliminary to the automatic operation, and means through which such relative movement determines the automatic operation in accordance with that shoe.

42. A machine for operating on shoes, having, in combination, a shoe support, a tool, mechanism for moving the shoe support from receiving to working position, mechanism for moving the tool into and out of working relation to the shoe on the support when in working position, and mechanism for relatively moving the tool and support to transfer the point of operation of the tool along the shoe while the support is in working position.

43. A machine for operating on shoes, having, in combination, a shoe support, a tool for operating on a shoe on the support, mechanism for moving the shoe support from receiving to working position, mechanism for moving the tool into working relation to the shoe on the support when in working position, mechanism for actuating the tool to operate progressively along the shoe, and mechanism for withdrawing the tool and returning the work support to receiving position after the completion of its operation on the shoe.

44. A machine for operating on shoes, having, in combination, a shoe support movable from receiving to working position, automatically operated edge setting tools for operating on the sole edge of a shoe on the support when in working position, and means for gaging a preliminary manual setting of the automatic mechanism by the shoe on the support when in receiving position.

45. A machine for operating on shoes, having, in combination, a shoe support movable from receiving to working position, automatically operated edge setting tools for operating on the sole edge of a shoe on the support when in working position, and gages arranged to be manually brought into register with the shoe on the support when in receiving position and connected to set the automatic mechanism for operation on that shoe.

46. A machine for operating on shoes, having, in combination, two forepart edge setting tools arranged to operate on opposite edges of the forepart and shoe sole, two shank edge setting tools arranged to operate on opposite edges of the shank of the shoe sole, a toe tool arranged to operate about the toe of the shoe sole, and mechanism for actuating all of said tools simultaneously in engagement with the sole edge.

47. A machine for operating on shoes, having, in combination, a shoe support movable from receiving to working position, and two forepart tools, two shank tools and a toe tool arranged to operate simultaneously on the two sides and about the toe of a shoe on the support when in working position.

48. A machine for operating on shoes, having, in combination, a shoe support movable from receiving to working position, two forepart tools, two shank tools, a toe tool, and mechanism for engaging the tools with a shoe on the support when in working position for actuating the tools to simultaneously operate on both sides and about the toe of the shoe sole and for thereafter withdrawing the tools and returning the support to receiving position.

49. A machine for operating on shoes, having, in combination, a shoe support movable from receiving to working position, two forepart tools, two shank tools, traversing mechanisms for the tools, gages adapted to be brought by the operator into register with the ball line and the heel line of the shoe on the support when in receiving position and connected with the traversing mechanisms for the tools to determine the length and position of the path of travel of each tool.

ERASTUS E. WINKLEY.

Corrections in Letters Patent No. 1,372,855.

It is hereby certified that in Letters Patent No. 1,372,855, granted March 29, 1921, upon the application of Erastus E. Winkley, of Lynn, Massachusetts, for an improvement in "Machines for Operating on Shoes," errors appear in the printed specification requiring correction as follows: Page 8, line 1, for the word "transversing" read *traversing;* page 9, line 2, for the word "bears" read *gears;* page 16, claim 39, strike out lines 77–78 and insert the words and comma *means for automatically operating along the marginal portion of a shoe on the support,;* and that the said Letters Patent should be read with these corrections therein that the same may conform to the record of the case in the Patent Office.

Signed and sealed this 17th day of May, A. D., 1921.

[SEAL.]
T. E. ROBERTSON,
*Commissioner of Patents.*

Cl. 12—78.